US012760204B2

(12) United States Patent
Han et al.

(10) Patent No.: US 12,760,204 B2
(45) Date of Patent: Oct. 13, 2026

(54) LIGHT-RESPONSIVE TEMPORARY ADHESIVES AND USE THEREOF

(71) Applicant: BRANDEIS UNIVERSITY, Waltham, MA (US)

(72) Inventors: Ggoch Ddeul Han, Waltham, MA (US); Mihael A. Gerkman, Waltham, MA (US)

(73) Assignee: BRANDEIS UNIVERSITY, Waltham, MA (US)

( * ) Notice: Subject to any disclaimer, the term of this patent is extended or adjusted under 35 U.S.C. 154(b) by 1226 days.

(21) Appl. No.: 17/608,594

(22) PCT Filed: May 4, 2020

(86) PCT No.: PCT/US2020/031340
§ 371 (c)(1),
(2) Date: Nov. 3, 2021

(87) PCT Pub. No.: WO2020/227226
PCT Pub. Date: Nov. 12, 2020

(65) Prior Publication Data

US 2022/0228035 A1 Jul. 21, 2022

Related U.S. Application Data

(60) Provisional application No. 62/843,144, filed on May 3, 2019.

(51) Int. Cl.

| | |
|---|---|
| ***C09J 7/38*** | (2018.01) |
| ***C09J 7/40*** | (2018.01) |
| ***C09J 139/00*** | (2006.01) |

(52) U.S. Cl.
CPC ................. *C09J 7/381* (2018.01); *C09J 7/40* (2018.01); *C09J 139/00* (2013.01); *C09J 2203/326* (2013.01); *C09J 2301/408* (2020.08); *C09J 2301/416* (2020.08); *C09J 2301/502* (2020.08)

(58) Field of Classification Search
None
See application file for complete search history.

(56) References Cited

U.S. PATENT DOCUMENTS

| | | | | |
|---|---|---|---|---|
| 3,532,540 | A | 10/1970 | Pearson et al. | |
| 6,191,199 | B1 * | 2/2001 | Renz ....................... | B32B 27/18 524/102 |
| 7,220,784 | B2 | 5/2007 | Hadfield et al. | |
| 7,556,844 | B2 | 7/2009 | Iftime et al. | |
| 7,777,055 | B2 | 8/2010 | Branda et al. | |
| 10,556,912 | B2 | 2/2020 | Branda et al. | |
| 2003/0002132 | A1 | 1/2003 | Foucher et al. | |
| 2006/0001944 | A1 | 1/2006 | Chopra et al. | |
| 2006/0286481 | A1 | 12/2006 | Lftime et al. | |
| 2008/0311495 | A1 * | 12/2008 | Norsten .................. | G03C 1/73 430/286.1 |
| 2014/0077139 | A1 * | 3/2014 | Amino ................. | C09J 123/283 252/586 |
| 2018/0355234 | A1 | 12/2018 | Grossman et al. | |
| 2019/0127345 | A1 | 5/2019 | Read De Alaniz et al. | |

FOREIGN PATENT DOCUMENTS

| | | | | |
|---|---|---|---|---|
| EP | 2003492 A1 * | 12/2008 | ............. | C09B 57/00 |
| WO | 95/16005 A1 | 6/1995 | | |

OTHER PUBLICATIONS

Jaber Kevyan Rad et al., "Spiropyran-based advanced photoswitchable materials: A facinating pathaway to the future stimuli-responsive devices", Journal of Photochemistry & Photobiology, 2022 (Year: 2022).*
Moumi Mandal et al., "Spiropyran-Merocyanine Based Photochromic Fluorescent Probes: Design, Synthesis, and Applications", ACS Omega, 2022 (Year: 2022).*
Definition of "Isoform" from Merriam-Webster, retrieved on Mar. 9, 2026 (Year: 2026).*
International Preliminary Report on Patentability for corresponding Application No. PCT/US2020/031340 (Nov. 2, 2021).
Gerkman et al., "Phase Transition of Spiropyrans: Impact of Isomerization Dynamics at High Temperatures," Chemical Communications 55:5813-5816 (2019).
International Search Report and Written Opinion for corresponding Application No. PCT/US2020/031340 (mailed Jul. 16, 2020).
Bremer et al., "Noncovalent Spiropryan Coatings for Photoinduced Wettability Switching," J. Nanomat. 2017(Article ID 6498601):1-6 (2017).
Kallweit et al., "Photoresponsive Hierarchical ZnO-PDMS Surfaces wtih Azobenzene-Polydopamine Coated Nanoparticles for Reversible Wettability Tuning," Vacuum 146:386-395 (2017).
Zhang et al., "Ultrafast Studies of Photochromic Spiropyrans in Solution," J. Am. Chem. Soc. 114:10921-10927 (1992).
Bleger, D. et al.; "o-Fluoroazobenzenes as readily synthesized photoswitches offering nearly quantitative two-way isomerization with visible light"; J Am Chem Soc, vol. 134; pp. 20597-20600; DOI: 10.1021/ja310323y (2012).
Calbo, et al.; "A Combinatorial Approach to Improving the Performance of Azoarene Photoswitches"; Beilstein J Org Chem, vol. 15; pp. 2753-2764 (2019).
Hemmer, et al.; "Controlling Dark Equilibria and Enhancing Donor-Acceptor Stenhouse Adduct Photoswitching Properties Through Carbon Acid Design"; J Am Chem Soc, vol. 140; pp. 10425-10429 (2018).
Klajn, R.; "Spiropyran-Based Dynamic Materials"; Chem Soc Rev, vol. 43; pp. 148-184 (2014).

(Continued)

*Primary Examiner* — Anish P Desai
(74) *Attorney, Agent, or Firm* — CANTOR COLBURN LLP

(57) ABSTRACT

The invention relates to a device that includes a substrate and a thin film of a photo-switchable adhesive layer applied to at least one surface of the substrate. A method of releasably supporting a product that includes adhering a product onto the thin film of the device and exposing the thin film to light sufficient to cause a change in the adhesive strength of the thin film. A method of making the device is also disclosed.

20 Claims, 8 Drawing Sheets

(56) References Cited

OTHER PUBLICATIONS

Kortekaas et al.; "The Evolution of Spiropyran: Fundamentals and Progress of an Extraordinarily Versatile Photochrome"; Chem Soc Rev, vol. 48; 3406 (2019).
Kundu, et al.; "Nanoporous Frameworks Exhibiting Multiple Stimuli Responsiveness"; Nat Commun, vol. 5, Article No. 3588 (2014).
Lee et al.; "Dual-Responsive Nanoparticles that Aggregate Under the Simultaneous Action of Light and CO2"; Chem Commun, vol. 51; pp. 2036-2039; DOI: 10.1039/C4CC08541H (2015).
Lerch, et al.; "Solvent Effects on the Actinic Step of Donor-Acceptor Stenhouse Adduct Photoswitching"; Angew Chem Int Ed, vol. 57; pp. 8063-8068 (2018).
Liu et al.; "Enhanced Two-Photon Photochromsism in Metasurface Perfect Absorbers"; Nano Lett, vol. 18; pp. 6181-6187 (2018).
Liu, et al.; "Thermally and Electrochemically Controllable Self-Complexing Molecular Switches"; J Am Chem Soc, vol. 126; pp. 9150-9151 (2004).
Lubbe et al.; "Molecular Motors in Aqueous Environment"; J Org Chem, vol. 83; pp. 11008-11018 (2018).
Marks, et al.; "Ultrathin Wafer Pre-Assembly and Assembly Process Technologies: A Review"; Crit Rev Solid State Mater Sci, vol. 40; pp. 251-290 (2015).
Morimoto et al.; "Photoswitchable Fluorescent Diarylethene Derivatives with Thiophene 1,1-Dioxide Groups: Effect of Alkyl Substituents at the Reactive Carbons"; Materials (Basel), vol. 10, Issue No. 9, 1021 (2017).
Natali, et al.; "Molecular Switches as Photocontrollable 'Smart' Receptors"; Chem Soc Rev, vol. 41; pp. 4010-4029 (2012).
Remon, et al.; "An Acido- and Photochromic Molecular Device that Mimics Triode Action"; Chem Commun, vol. 52; pp. 4659-4662 (2016).
Samanta et al.; "Reversible Chromism of Spiropyran in the Cavity of a Flexible Coordination Cage"; Nature Commun, vol. 9; 641 (2018).
Samanta et al.; "Reversible Photoswitching of Encapsulated Azobenzenes in Water"; PNAS, vol. 115; pp. 9379-9384; DOI:10.1073/pnas.1712787115 (2018).
Sun et al.; "An Electrochromic Tristable Molecular Switch"; J Am Chem Soc, vol. 137; pp. 13484-13487 (2015).
Tanskanen, P.; "Management and Recycling of Electronic Waste"; Acta Mater, vol. 61; pp. 1001-1011 (2013).
Uno, et al.; "Multicolor Fluorescent 'Sulfide-Sulfone' Diarylethenes with High Photo-Fatigue Resistance"; Chem Commun, vol. 56; pp. 2198-2201 (2020).
Wang, et al.; "Photochemically and Thermally Driven Full-Color Reflection in a Self-Organized Helical Superstructure Enabled by a Halogen-Bonded Chiral Molecular Switch"; Angew Chem Int Ed, vol. 57; pp. 1627-1631 (2018).
Weston, et al.; "Arylazopyrazoles: Azoheteroarene Photoswitches Offering Quantitative Isomerization and Long Thermal Half-Lives"; J Am Chem Soc, vol. 136, Issue No. 34; pp. 11878-11881; DOI: 10.1021/ja505444d (2014).
Arden; "The International Technology Roadmap for Semiconductors—Perspectives and Challenges for the Next 15 Years"; Curr Opin Solid State Mater Sci, vol. 6; pp. 371-377 (2002).
Berberich et al.; "Toward Fluorescent Memories with Nondestructive Readout: Photoswitching of Fluorescence by Intramolecular Electron Transfer in a Diaryl Ethene-Perylene Bisimide Photochromic System"; Angew Chem Int Ed, vol. 47; pp. 6616-6619 (2008).
Beyer, et al.; "Synthesis of Spiropyrans as Building Blocks for Molecular Switches and Dyads"; J Org Chem, vol. 75, Issue No. 8; pp. 2752-2755 (2010).
Dixon, et al.; "Total Suppression of Sidebands in CPMAS C-13 NMR"; J Magn Reson, vol. 49; pp. 341-345 (1982).
Duan et al.; "Composite-Pulse and Partially Dipolar Dephased MultiCP for Improved Quantitative Solid-State 13C NMR"; J Magn Reson, vol. 285; pp. 68-78; DOI: 10.1016/j.jmr.2017.10.010 (2017).
Fang, et al.; "Biomimetic Modular Polymer with Tough and Stress Sensing Properties"; Macromolecules, vol. 46; pp. 6566-6574; DOI: 10.1021/ma4014862 (2013).
Fung, et al.; "An Improved Broadband Decoupling Sequence for Liquid Crystals and Solids"; J Magn Reson, vol. 142; pp. 97-101 (2000).
Irie et al.; "Photochromism of Diarylethene Molecules and Crystals: Memories, Switches, and Actuators"; Chem Rev, vol. 114; pp. 12174-12277 (2014).
Julia-Lopez, et al.; "Temperature-Controlled Switchable Photochromism in Solid Materials"; Angew Chem Int Ed, vol. 55; pp. 15044-15048 (2016).
Lerch, et al.; "The (Photo)chemistry of Stenhouse Photoswitches: Guiding Principles and System Design"; Chem Soc Rev, vol. 47; pp. 1910-1937 (2018).
Lv, et al.; "Photocatalyzed Oxidative Dehydrogenation of Hydrazobenzenesto Azobenzenes"; Green Chem, vol. 21, Issue No. 15; pp. 4055-4061 (2019).
Mao et al.; "Accurate Quantification of Aromaticity and Nonprotonated Aromatic Carbon Fraction in Natural Organic Matter by 13C Solid-State Nuclear Magnetic Resonance"; Environ Sci Technol, vol. 38; pp. 2680-2684; DOI: 10.1021/es034770x (2004).
Niklaus, et al.; "Adhesive Wafer Bonding"; J Appl Phys, vol. 99; 031101 (2006).
Park, et al.; "Photoswitching and Sensor Applications of a Spiropyran-Polythiophene Conjugate"; Chem Commun, vol. 46; pp. 2859-2861 (2010).
Pei et al.; "Grinding of Silicon Wafers: A Review from Historical Perspectives"; Int J Mach Tool Manu, vol. 48; pp. 1297-1307 (2008).
Rathore, et al.; "A Redox-Controlled Molecular Switch Based on the Reversible C—C Bond Formation in Octamethoxytetraphenylene"; Angew Chem Int Ed, vol. 39; pp. 809-812; doi: 10.1002/(sici)1521-3773(20000218) 39:4<809::aid-anie809>3.0.co;2-6 (2000).
Ren et al.; "A Multicontrolled Enamine Configurational Switch Undergoing Dynamic Constitutional Exchange"; Angew Chem Int Ed, vol. 57; pp. 6256-6260 (2018).
Russew, et al.; "Photoswitches: From Molecules to Materials"; Adv Mater, vol. 22; pp. 3348-3360; DOI:10.1002/adma.200904102 (2010).
Senthilkumar, et al.; "Conjugated Polymer Nanoparticles with Appended Photo-Responsive Units for Controlled Drug Delivery, Release and Imaging"; Angew Chem Int Ed, vol. 57; pp. 13114-13119 (2019).
Shvartsman, et al.; "Quasi-Liquid Crystals"; Nature, vol. 309; pp. 608-611 (1984).
Stricker et al.; "Arylazopyrazole Photoswitches in Aqueous Solution: Substituent Effects, Photophysical Properties, and Host-Guest Chemistry"; Chemistry Eur J, vol. 24, Issue No. 34; pp. 8639-8647; DOI: 10.1002/chem.201800587 (2018).
Xiao, et al.; "A Dual-Functional Supramolecular Hydrogel Based on a Spiropyran-Galactose for Target-Mediated and Light-Controlled Delivery of MicroRNA into Cells"; Chem Commun, vol. 52; pp. 12517-12520 (2016).
Yamaguchi, et al.; "Photochromism of bis(2-alkyl-1-benzothiophen-3-yl) Perfluorocyclopentene Derivatives"; Journal of Photochemistry and Photobiology A: Chemistry, vol. 178; pp. 162-169 (2006).
Yang, et al.; "Stilbene analogs in Hula-Twist Photoisomerization"; Photochem Photobiol Sci, vol. 5; pp. 874-882 (2006).

* cited by examiner

C
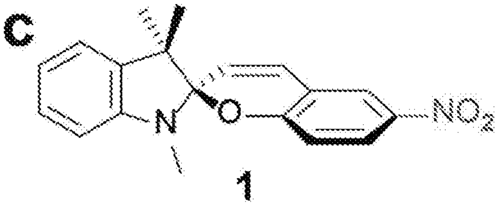
1
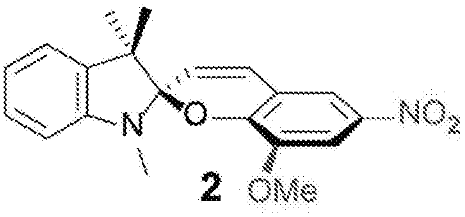
2
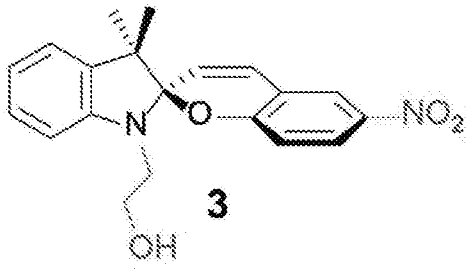
3
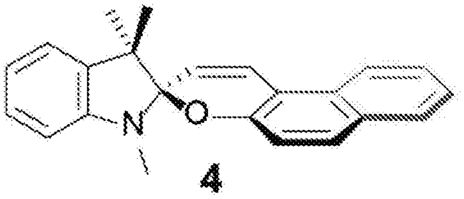
4
*FIG. 2C*
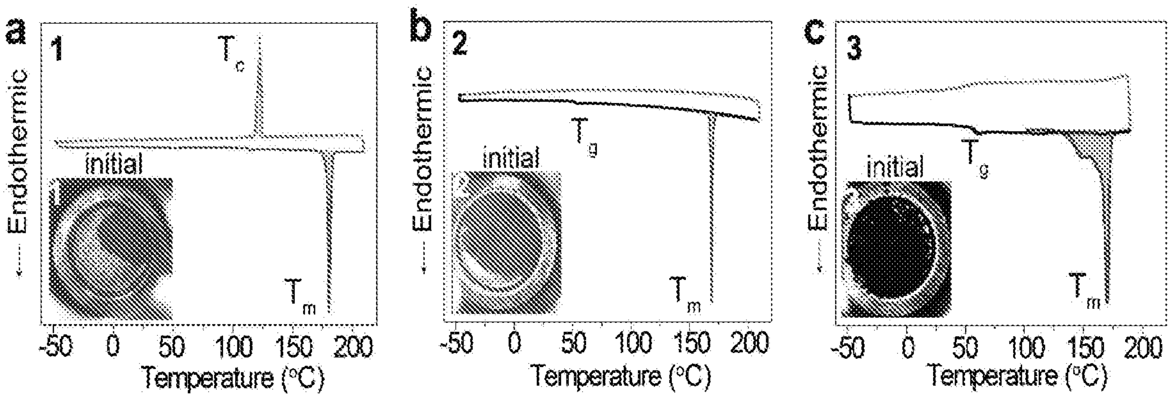
*FIGS. 3A-C*

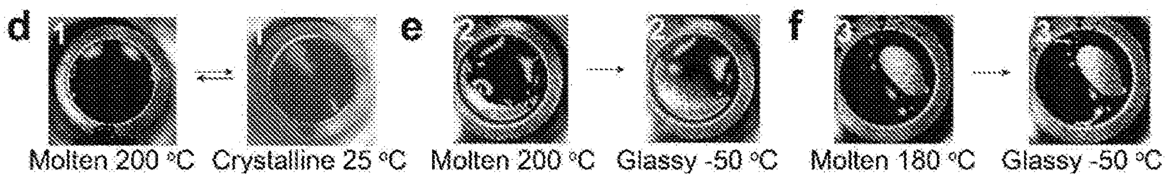
*FIGS. 3D-F*
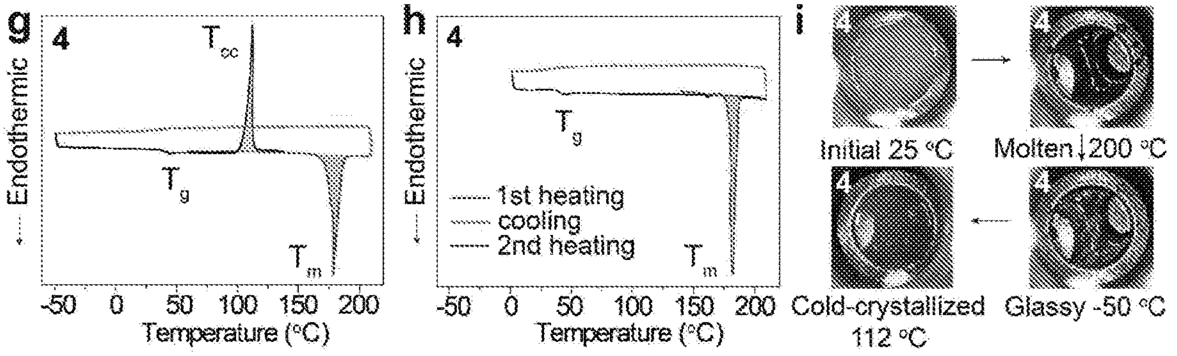
*FIGS. 3G-I*
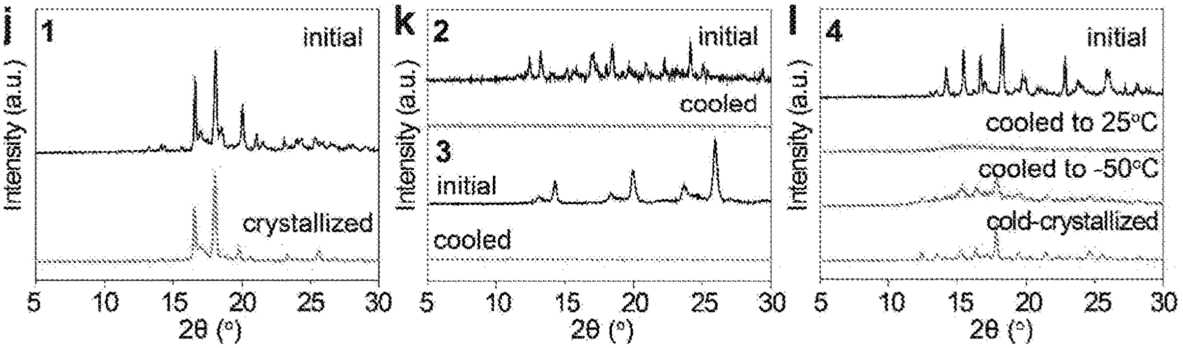
*FIGS. 3J-L*

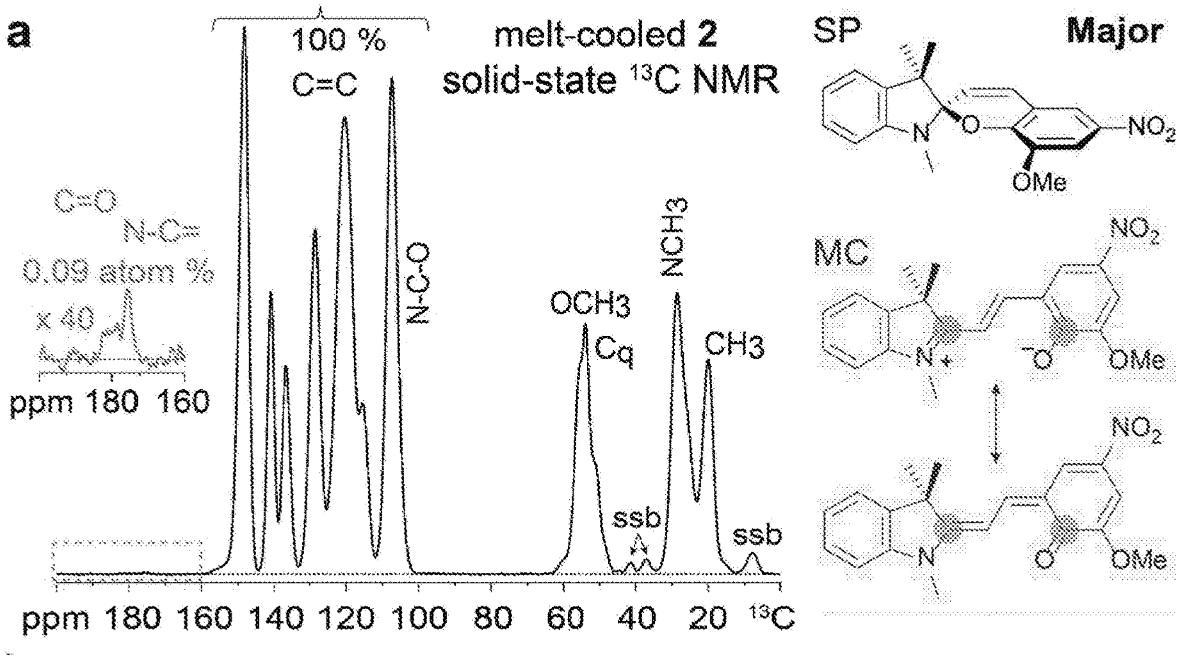
*FIG. 4A*
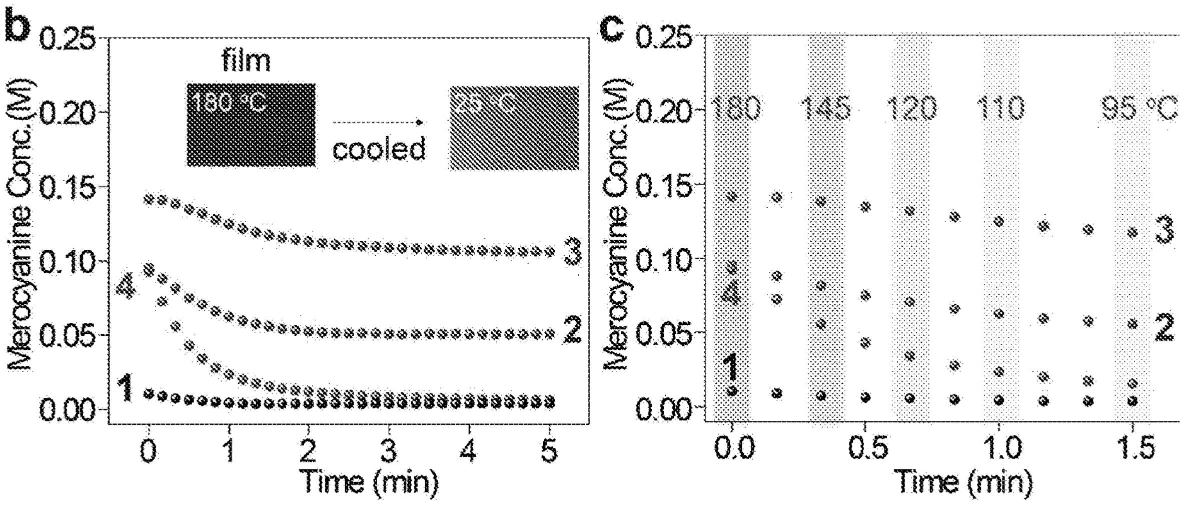
*FIGS. 4B-C*

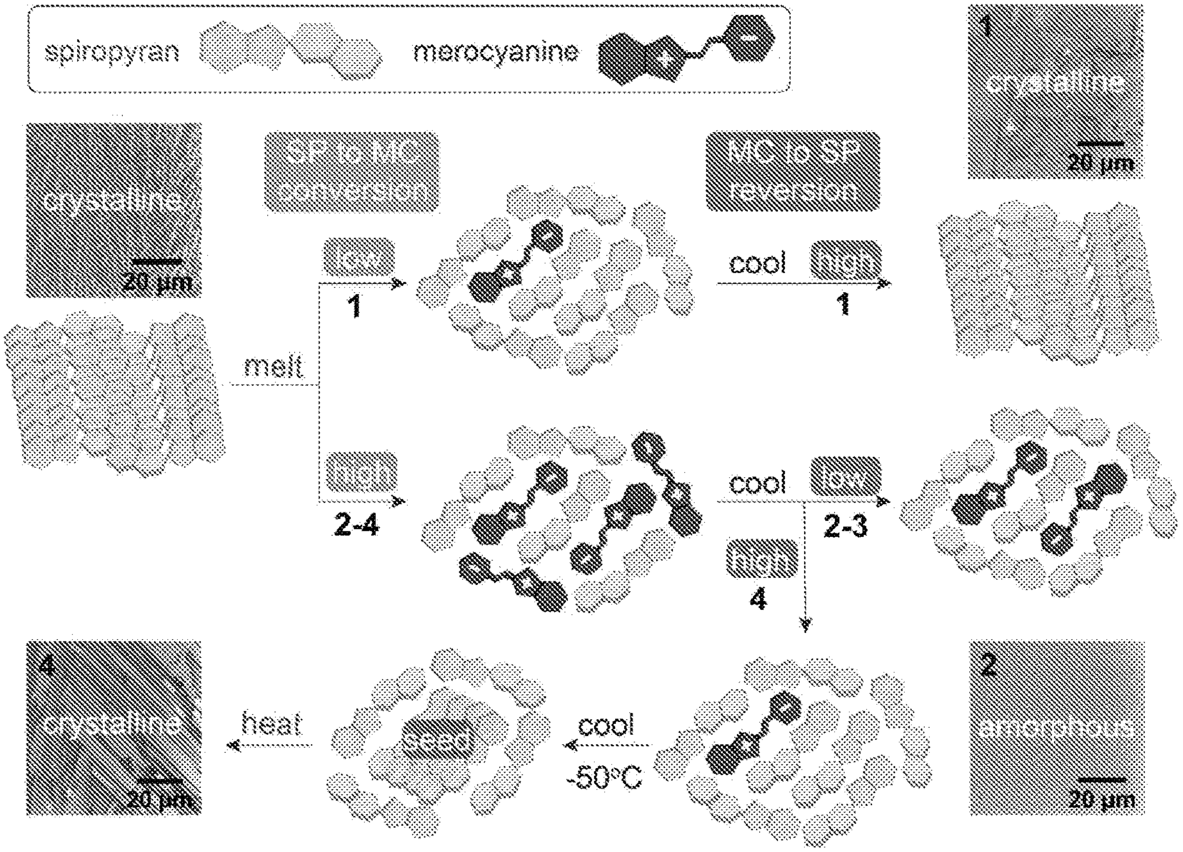
*FIG. 5*
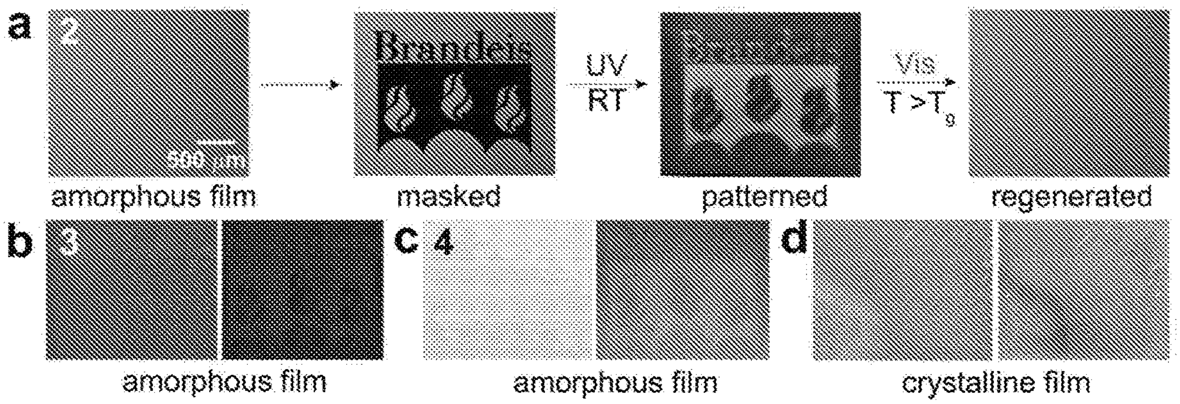
*FIGS. 6A-D*

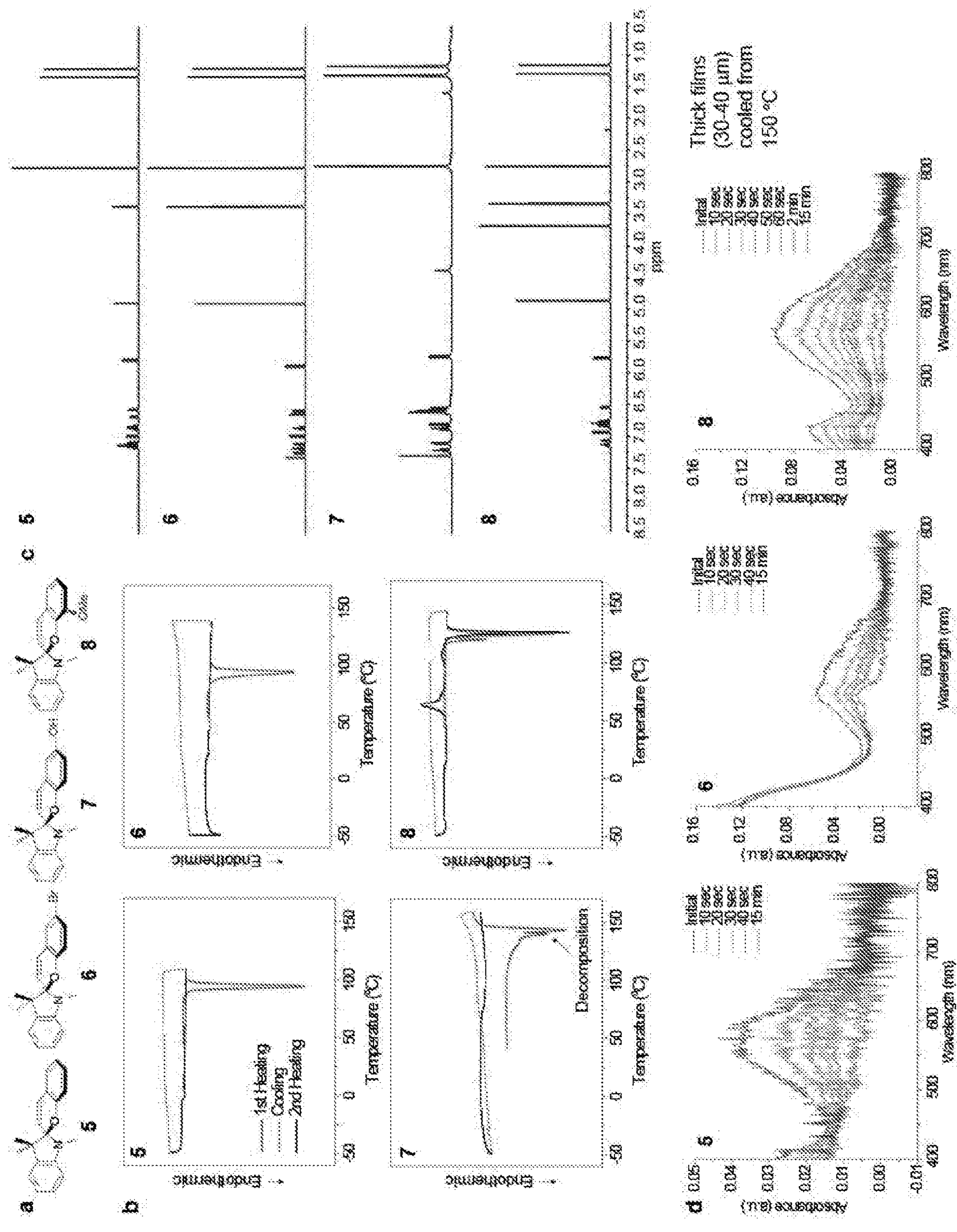
*FIGS. 7A-D*

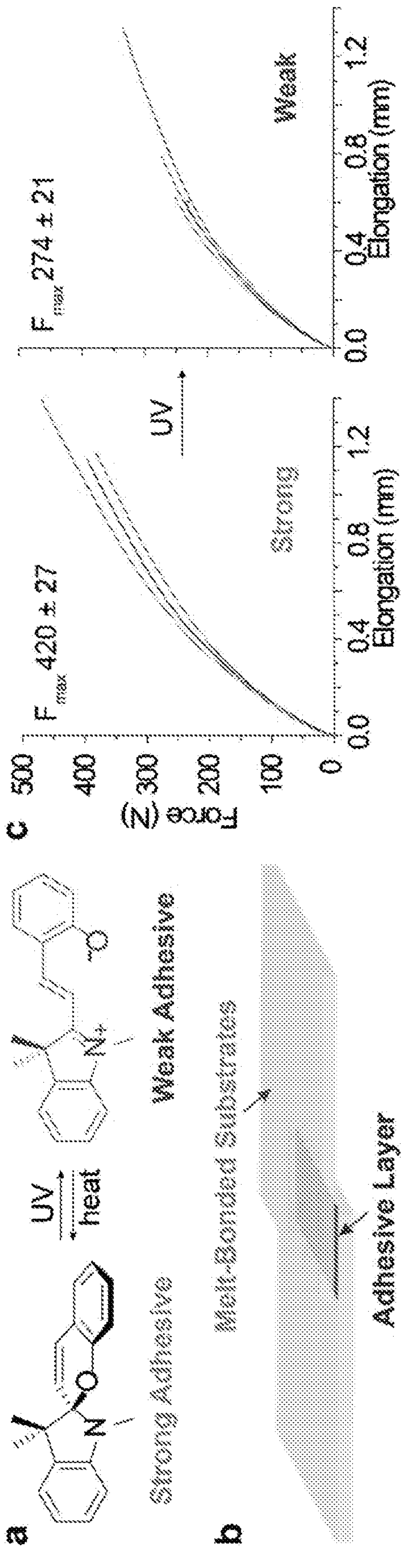
*FIGS. 8A-C*

LIGHT-RESPONSIVE TEMPORARY ADHESIVES AND USE THEREOF

This application is a national stage application under 35 U.S.C. § 371 of PCT Application No. PCT/US2020/031340, filed May 4, 2020, which claims the priority benefit of U.S. Provisional Patent Application Ser. No. 62/843,144, filed May 3, 2019, which is hereby incorporated by reference in its entirety.

This invention was made with government support under Award No. 1726346 awarded by National Science Foundation. The government has certain rights in the invention

FIELD OF THE INVENTION

The present invention relates to temporary adhesive materials whose strength can be regulated by application of light, and methods of using the same.

BACKGROUND OF THE INVENTION

Molecules that change their conformation upon exposure to external stimuli have been of interest to diverse fields of study and applications such as sensing (Park et al., "Photoswitching and Sensor Applications of a Spiropyran—Polythiophene Conjugate," *Chem. Commun.* 46:2859-2861 (2010)), drug delivery (Senthilkumar et al., "Conjugated Polymer Nanoparticles with Appended Photo-Responsive Units for Controlled Drug Delivery, Release, and Imaging," *Angew. Chem. Int. Ed.* 57:13114-13119 (2018)), and memory (Berberich et al., "Toward Fluorescent Memories with Nondestructive Readout: Photoswitching of Fluorescence by Intramolecular Electron Transfer in a Diaryl Ethene-Perylene Bisimide Photochromic System," *Angew. Chem. Int. Ed.* 47:6616-6619 (2008)) due to the rapid and significant changes of their physical properties (Natali et al., "Molecular Switches as Photocontrollable "Smart" Receptors," *Chem. Soc. Rev.* 41:4010-4029 (2012)). Diverse molecules have been designed and further tailored to enhance their response to a specific stimulus, such as light (Lubbe et al., "Molecular Motors in Aqueous Environment," *J. Org. Chem.* 83:11008-11018 (2018)), heat (Wang et al., "Photochemically and Thermally Driven Full-Color Reflection in a Self-Organized Helical Superstructure Enabled by a Halogen-Bonded Chiral Molecular Switch," *Angew. Chem. Int. Ed.* 57:1627-1631 (2018)), current (Sun et al., "An Electrochromic Tristable Molecular Switch," *J. Am. Chem. Soc.* 137:13484-13487 (2015)), pH (Kundu et al., "Nanoporous Frameworks Exhibiting Multiple Stimuli Responsiveness," *Nat. Commun.* 5:3588 (2014), metal ions (Ren et al., "A Multicontrolled Enamine Configurational Switch Undergoing Dynamic Constitutional Exchange," *Angew. Chem. Int. Ed.* 57:6256-6260 (2018)), or toxic gases (Lee et al., "Dual-Responsive Nanoparticles that Aggregate Under the Simultaneous Action of Light and $CO_2$," *Chem. Commun.* 51:2036-2039 (2015)). Molecules that exhibit a reversible response to a stimulus by isomerization are of particular interest since they enable repeated operation. Molecules with a significant color change during the reversible isomerization, such as spiropyran (Rafal Klajn, "Spiropyran-Based Dynamic Materials," *Chem. Soc. Rev.* 43:148-184 (2014)), diarylethene (Irie et al., "Photochromism of Diarylethene Molecules and Crystals: Memories, Switches, and Actuators," *Chem. Rev.* 114:12174-12277 (2014)), and donor-acceptor Stenhouse adduct (Lerch et al., "The (Photo)chemistry of Stenhouse Photoswitches: Guiding Principles and System Design," *Chem. Soc. Rev.* 47:1910-1937 (2018); Hemmer et al., "Controlling Dark Equilibria and Enhancing Donor-Acceptor Stenhouse Adduct Photoswitching Properties Through Carbon Acid Design," *J. Am. Chem. Soc.* 140:10425-10429 (2018)), have been widely explored for developing chromic sensors.

The fundamental understanding of the chromic isomerization is generally achieved by solution-state nuclear magnetic resonance (NMR) and UV-Visible absorption spectroscopy (UV-Vis), which monitor the relative population of isomers in the solution mixtures. Thermochromic (Liu et al., "Thermally and Electrochemically Controllable Self-Complexing Molecular Switches," *J. Am. Chem. Soc.* 126:9150-9151 (2004)), photochromic (Samanta et al., "Reversible Photoswitching of Encapsulated Azobenzenes in Water," *Proc. Natl. Acad. Sci.* 115:9379-9384 (2018)), solvatochromic (Lerch et al., "Solvent Effects on the Actinic Step of Donor-Acceptor Stenhouse Adduct Photoswitching," *Angew. Chem. Int. Ed.* 57:8063-8068 (2018)), acidochromic (Remón et al., "An Acido- and Photochromic Molecular Device that Mimics Triode Action," *Chem. Commun.* 52:4659-4662 (2016)), and electrochromic (Rathore et al., "A Redox-Controlled Molecular Switch Based on the Reversible C—C Bond Formation in Octamethoxytetraphenylene," *Angew. Chem. Int. Ed.* 39:809-812 (2000)) behaviors of diverse molecules have been primarily investigated in dilute solution, where unhindered structural changes are promoted by solvation. Isomerization of molecules dispersed in polymers (Fang et al, "Biomimetic Modular Polymer with Tough and Stress Sensing Properties," *Macromolecules* 46:6566-6574 (2013)), hydrogels (Xiao et al., "A Dual-Functional Supramolecular Hydrogel Based on a Spiropyran-Galactose Conjugate for Target-Mediated and Light-Controlled Delivery of MicroRNA into Cells," *Chem. Commun.* 52:12517-12520 (2016)), and other soft matrices (Julià-López et al., "Temperature-Controlled Switchable Photochromism in Solid Materials," *Angew. Chem. Int. Ed.* 55:15044-15048 (2016)) including liquid crystals (Russew et al., "Photoswitches: From Molecules to Materials," *Adv. Mater.* 22:3348-3360 (2010)) that allow for the structural changes has also been widely investigated for solid-state applications (see FIG. 2A).

The study of molecular isomerization in solid or liquid 'neat' phase (i.e. pristine molecules without any solvent or matrix), however, has been rather limited as the result of difficulties in achieving structural changes due to the close packing of molecules in the solid state or high temperature required to reach the molten state. At temperatures far above ambient, the energy input from the surroundings creates a new equilibrium of isomerization. Exploring a melt state of isomerizing molecules at a temperature close to 200° C. can provide new insights into thermodynamically-driven isomerization in condensed phase, which is drastically different from the isomerization dynamics at room temperature in solution. In the 1980s, Krongauz and coworkers presented remarkable studies of spiropyrans functionalized with mesogenic groups forming quasi-liquid crystals at elevated temperatures (50-130° C.), but the focus was on the observation of birefringence from solution-cast metastable films (Shvartsman et al., "Quasi-Liquid Crystals of Thermochromic Spiropyrans. A Material Intermediate Between Supercooled Liquids and Mesophases," *J. Phys. Chem.* 88:6448-6453 (1984); Shvartsman et al., "Quasi-Liquid Crystals," *Nature* 309:608-611 (1984)).

Adhesives are commonly used in daily life, and in specialty circumstances such as between silicon components in electronic devices (Garrou et al., *Handbook of* 3*D Integration*. Vol. 3, 3D process technology. Weinheim, Germany:

Wiley-VCH: (2014); Tanskanen, P., "Management and Recycling of Electronic Waste," *Acta Mater.* 61:1001-1011 (2013)). Various strategies and formulae have been developed to achieve high adhesive strengths suitable for a wide range of uses, but the selective and controlled removal of adhesives has remained a significant challenge especially in the fabrication of electronics devices (Garrou et al., *Handbook of 3D Integration*. Vol. 3, 3D process technology. Weinheim, Germany: Wiley-VCH: (2014); Pei et al., "Grinding of Silicon Wafers: A Review from Historical Perspectives," *Int. J. Mach. Tool Manu.* 48:1297-1307 (2008); Mittal and Ahsan, *Adhesion in Microelectronics*; Adhesion and Adhesives: Fundamental and Applied Aspects; John Wiley and Sons: Hoboken, New Jersey (2014). It would be desirable, therefore, to identify new types of adhesives whose bonding strength can be selectively controlled and whose variable bonding strengths are adapted for use in the manufacture of electronics components.

The present invention is directed to overcoming these and other deficiencies in the art.

SUMMARY OF THE INVENTION

A first aspect of the present invention relates to a device that includes a substrate and a thin film of a photo-switchable adhesive applied to at least one surface of the substrate. In certain embodiments, the thin film of photo-switchable adhesive consists essentially of, or consists of, the photo-switchable adhesive material without diluents, solvents, or additives.

A second aspect of the present invention relates to a method of releasably supporting a product. This method includes adhering a product onto the thin film of the device according to the first aspect of the invention; and exposing the thin film to light sufficient to cause a change in the adhesive strength of the thin film.

A third aspect of the present invention relates to a method of making a device according to the first aspect of the invention. This method includes providing the device having the substrate and applying the thin film to the substrate.

Isomerization behaviors of spiropyran derivatives in neat condensed phase were studied to understand their unusual phase transitions including cold-crystallization after extreme supercooling down to −50° C. Compounds with different functional groups were compared, and the equilibrium between isomers at high temperatures was found to determine phase transitions. Importantly, it was demonstrated that upon exposure to light of an appropriate wavelength that thin films exhibit decreased strength, allowing such films to behave as adhesives with light-inducible changes in strength. Application of the thin films and bonding of a component to a substrate can be achieved using a simple melt-bonding, and the debonding process leaves negligible adhesive residue, demonstrating the potential for these adhesives in applications that require quick adhesion and selective debonding (Arden, "The International Technology Roadmap for Semiconductors—Perspectives and Challenges for the Next 15 Years," *Curr. Opin. Solid State Mater. Sci.* 6:371-377 (2002); Marks et al., "Ultrathin Wafer Pre-Assembly and Assembly Process Technologies: A Review," *Crit. Rev. Solid State Mater. Sci.* 40:251-290 (2015); Niklaus et al., "Adhesive Wafer Bonding," *J. Appl. Phys.* 99:031101 (2006), each of which is hereby incorporated by reference in its entirety. These photo-switchable adhesives shows advantages of quick, gentle, on-command, and residue-free detachment. A more gentle debonding process should lead to lower rates of substrate damage, which produces a higher yield of finer quality industrial products. Because the debonding process is triggered by light, it can be operated locally and controlled more precisely with a narrow beam of light, enabling meticulous work such as the detachment of micron-scale components on electronics for the optimization of multi-step assembly and the customization of intricate devices.

BRIEF DESCRIPTION OF THE DRAWINGS

FIGS. 2A-C show isomerization between spiropyran (SP) and merocyanine (MC) forms, occurring in solvated or dispersed conditions (FIG. 2A, Prior Art), energy diagram of phase transition and simultaneous isomerization of SP during initial melting and subsequent cooling below the melting point (Tm) and the supercooled liquid becomes an amorphous solid below the glass transition point (Tg) (FIG. 2B), and chemical structures for four SP derivatives (Compounds 1-4) among eight compounds studied (FIG. 2C). Compounds 5-8 are shown in FIG. 7A.

FIGS. 3A-C show DSC curves of compounds 1 (FIG. 3A), 2 (FIG. 3B), and 3 (FIG. 3C). Insets are low magnification optical microscope images (5×5 mm) of initial crystalline powder. FIGS. 3D-F are images of compounds 1 (FIG. 3D), 2 (FIG. 3E), and 3 (FIG. 3F) taken during heating and cooling cycles of DSC. FIGS. 3G-H show DSC curves of compound 4 being first melted (red curve), subsequently cooled (blue curve), then re-heated (black curve). Cold crystallization of compound 4 was not observed when the molten compound was cooled to 0° C. as shown in FIG. 3H. Tm: melting point, Tc: crystallization point, Tg: glass transition point, Tcc: cold-crystallization point. Shaded areas integrate to yield the specific enthalpy (in J/g) for each phase transition. FIG. 3I show images of compound 4 taken during heating and cooling cycles of DSC, showing relevant phase transitions. FIGS. 3J-L show XRD patterns of compounds 1 (FIG. 3J), 2 and 3 (FIG. 3K), and 4 (FIG. 3L) at initial crystalline state and after heating and cooling cycles.

FIG. 4A shows solid-state $^{13}C$ NMR spectrum of melt-cooled compound 2 at room temperature. The inset on the left shows the signals at >160 ppm after 40-fold vertical scaling. The two peaks observed correspond to 0.7±0.2 wt % of the MC isomer. "ssb": spinning sideband. FIG. 4B shows change of MC concentration (solution-NMR-calibrated), from absorbance at 550-600 nm, in neat films of compounds 1-4 during the spontaneous cooling under ambient condition, once heated above the Tm. After 5 min, the films reach room temperatures. Inset to FIG. 4B are digital images of the film of compound 2 during this cooling process. FIG. 4C shows initial change of MC concentration measured during 1.5 min. Temperature change was measured by an IR thermometer.

FIG. 5 is a schematic illustration of the phase change of compounds 1-4. High magnification optical microscope images show the morphology of thin film samples at each stage. Depending on the relative SP and MC content (illustrative, not quantitative presentation), the crystallinity of melt-cooled compound is determined, as minor MC plays a role as a dopant that prevents crystallization of liquid phase.

FIGS. 6A-C show results of the thin film patterning experiment showing that exposure to UV effectively isomerizes SP molecules in the amorphous solid of compound 2 (FIG. 6A), 3 (FIG. 6B), and 4 (FIG. 6C). FIG. 6D shows that crystalline film of compound 1 showed difficulty of patterning and crystalline features.

FIG. 7A shows chemical structures of compounds 5-8, and FIG. 7B shows DSC curves of compounds 5-8 showing initial melting (simultaneous decomposition for compound 7), cooling to −50° C., and the second heating. Compounds 5-8 all exhibit lower melting points compared to compounds 1-4. FIG. 7C shows NMR spectra of compounds 5-8 in concentrated solutions (>1 mg/mL) of MeOH. FIG. 7D shows UV-Vis spectra of compounds 5, 6, and 8 in thick films (30-40 μm) cooled from 150° C. Compound 7 decomposed while melting (not shown).

FIG. 8A illustrates the processes for controlling the adhesive strength of the thin-film comprising a generic spiropyran-merocyanine photo-switchable adhesive. Heating above the melting temperature promotes stronger adhesion, whereas UV irradiation promotes weaker adhesion. FIG. 8B illustrates the principle of a thin film of the photo-switchable adhesive between two substrates. FIG. 8C illustrates the substantial decrease in debonding force when using a ~5 μm film of compound 4 (1,3,3-Trimethylspiro[indoline-2,3'-[3H]naphth[2,1-b]pyran]).

DETAILED DESCRIPTION OF THE INVENTION

One aspect of the present invention relates to a device that includes a first substrate and a thin film of a photo-switchable adhesive applied to at least one surface of the first substrate.

Figure 1:
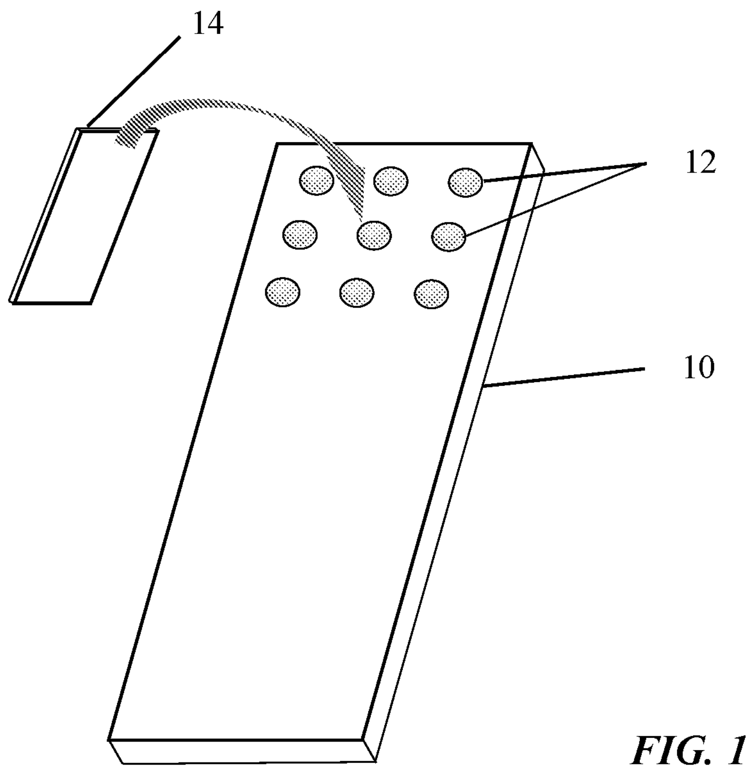
FIG. 1 illustrates a device that includes a substrate 10 having thin film 12 applied in discrete locations on the substrate surface. The thin film is a photo-switchable adhesive material in a glassy state. A second substrate 14 will be bonded to the substrate 10 when it is applied to the thin films such as during a melt bonding step (arrow).
Figure 2A:
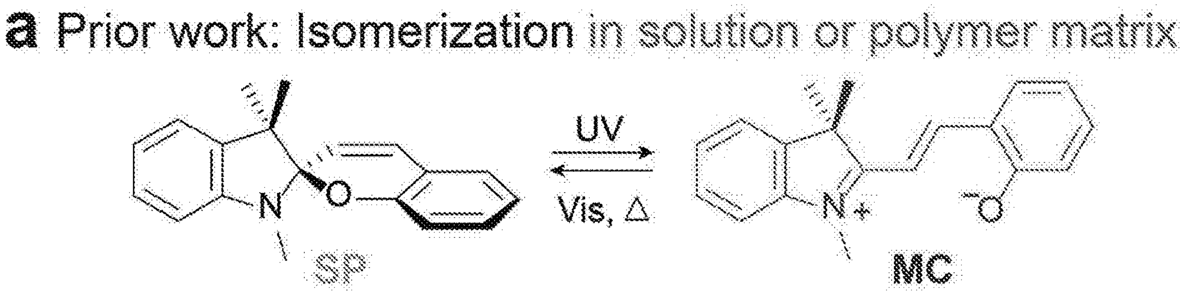
(Prior Art) FIG. 2A
Figure 2B:
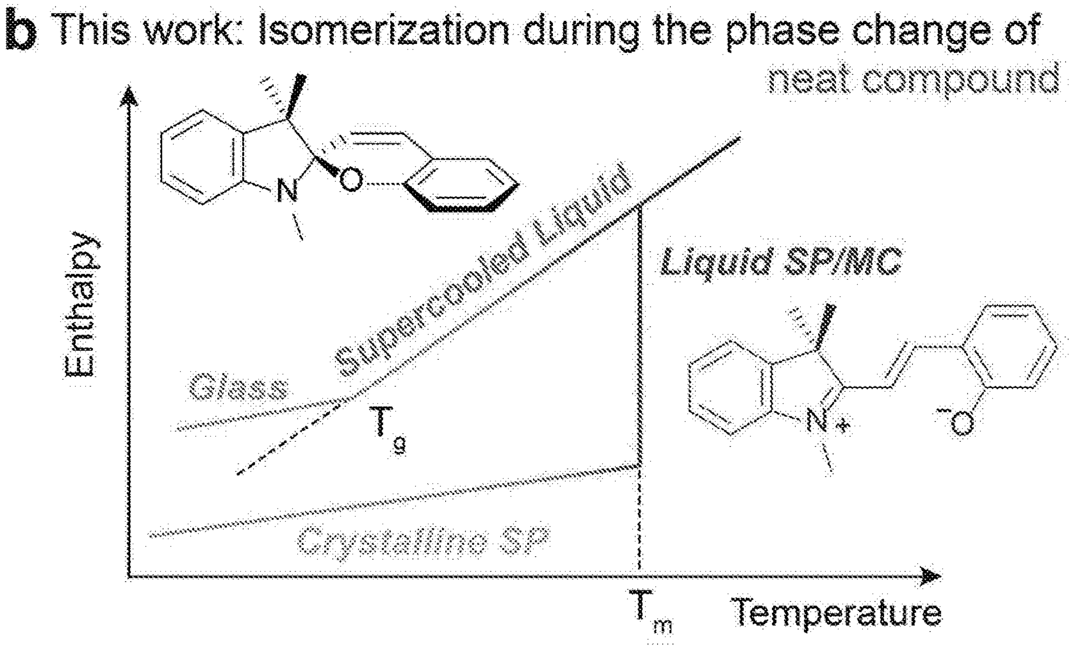

Referring to FIG. 1, the first substrate 10 can be in the form of a device designed to adhesively support a second device 14 via the thin film 12, for example a work piece holding apparatus where the holding apparatus contains the first substrate and the work piece is the second device. Examples of such a holding apparatus include, without limitation, a holding device for an electronics component or a silicon wafer.

Alternatively, the first substrate can be in the form of a device designed to be adhesively attached to a larger structure, such as a window, wall surface, or the like. Non-limiting examples of such a device include mounting hooks or brackets that are intended to be temporarily secured to a structural surface.

The substrates to be releasably adhered together include, without limitation, metals, metal oxides, polymer materials (e.g., thermoplastic materials, polymer coated surfaces, etc.), glasses, and ceramics. The substrates can be the same or different, and can be porous or non-porous. Importantly, the substrates should not be friable in nature.

In certain embodiments, the thin film comprises a single, substantially pure photo-switchable compound (as well as the isoforms thereof). As used herein, "substantially pure" is intended to mean that the isoforms of the compound comprise at least 95% by weight of the thin film, or at least 96% by weight of the thin film, at least 97% by weight of the think film, at least 98% by weight of the thin film, or at least 99% by weight of the thin film. In certain embodiments, the thin film consists essentially of, or consists of, the photo-switchable compound isoforms. In certain embodiments, the thin film is essentially free of additives (including fillers and/or diluents, and the like), in which case the thin film contains less than 5% by weight of any additives, less than 4% by weight of any additives, less than 3% by weight of any additives, less than 2% by weight of any additives, less than 1% by weight of any additives, less than 0.5% by weight of any additives, or less than 0.1% by weight of any additives.

When releasably adhering together first and second substrates, the thin film can be discontinuous (see FIG. 1), in which case it is present in a plurality of discrete locations over the total contact area between the two substrates, or the thin film can be continuous. In the embodiments where the thin film is discontinuous, the degree of thin film coverage will depend on the desired strength of the adhesion between the first and second substrates. For example, the total surface area coverage can be about 20 to about 40% of the total contact surface area for weaker adhesion, about 40 to about 70% of the total contact surface area for intermediate adhesion, and greater than about 70% of the total contact surface area for stronger adhesion, up to continuous coverage for maximal adhesion between the two substrates.

According to the present invention, film thickness can be varied. Desirably, the thinnest suitable film that provides the desired adhesion strength is preferred since it is more economical to use less material. In certain embodiments, the film thickness (whether continuous or discontinuous) is up to several millimeters. In certain embodiments, the film is between about 500 μm up to about 2 millimeters, such as from about 500 μm up to about 1 millimeter, or about 1 millimeter up to about 2 millimeters. In alternative embodiments, the film is less than 500 μm, less than 450 μm, less than 400 μm, less than 350 μm, less than 300 μm, less than 250 μm, less than 200 μm, less than 190 μm, less than 180 μm, less than 170 μm, less than 160 μm, less than 150 μm, less than 140 μm, less than 130 μm, less than 120 μm, less than 110 μm, less than 100 μm, less than 90 μm, less than 80 μm, less than 70 μm, less than 60 μm, less than 50 μm, less than 40 μm, less than 30 μm, less than 20 μm, or less than 10 μm in thickness. In certain embodiments, the film is between about 1 to about 10 μm in thickness, such as from about 1 to about 5 μm, or about 6 to about 10 μm, or about 2 to about 8 5 μm in thickness.

The thin film can be applied by any of a variety of approaches as long as the film is eventually heated above its melting temperature, preferably between about 150° C. and about 200° C. (such as between 175° C. and 200° C.). Application can be carried out using spin-coating, spray-coating, dip-coating, printing, using a doctor blade technique, or other similar techniques. Where solvent-based deposition techniques are used, after application of the thin film the solvent is removed such as by evaporation (with or without heating).

As demonstrated in the accompanying examples, melting of the photo-switchable adhesive can be carried out at temperatures above the melting temperature up to as high as about 180-200° C. Supercooling of the thin film allows the film to possesses the substantially pure photo-switchable compound in an amorphous glassy state. In some embodiment, the substantially pure photo-switchable compound may contain a major component in the form of one isomer and minor component in the form of the other isomer. In some embodiments, the minor component is present in an amount of about 10% or less by weight of the film, about less than about 5%, 4%, 3%, or 2% by weight of the film, or less than about 1%, 0.5%, 0.4%, 0.3%, 0.2%, or 0.1% by weight of the film. By way of example with the spiropyran-merocyanine isomers, it is only after photo-activation by light of appropriate wavelength that the merocyanine form exists in abundance, whereby adhesive strength is diminished.

Where the two substrates are intended to be joined while the thin film material remains in the molten state, melt bonding is highly desirable and the amount of pressure applied while melt bonding is between about 0.01 to about 10 MPa, preferably between about 0.01 to about 0.5 MPa.

In certain embodiments, where the two substrates are intended to be joined at a later time, it is desirable to protect the thin film as applied to the first substrate by applying a release layer over the thin film. The release layer will prevent contamination prior to use. Where a release layer is used, prior to bonding the first and second substrates the release layer will be removed and then the thin film will be heat activated to enhance the adhesion of the thin film to the second substrate. Heat activation can be achieved by heating the film using, e.g., infrared light or any other means suitable to heat the film to a temperature exceeding its melting temperature.

Exemplary classes of photo-switching compounds suitable for use as adhesive materials in the present invention include, but are not limited to, spiropyrans (in which case the thin film in its glassy state will primarily contain the spiropyran but may also contain the merocyanine), azobenzeness (in which case the thin film in its glassy state will primarily contain the cis isomer but may also contain the trans isomer), arylazopyrroles (in which case the thin film in its glassy state will primarily contain the cis isomer but may also contain the trans isomer), and arylazopyrazoles (in which case the thin film in its glassy state will primarily contain the cis isomer but may also contain the trans isomer). Other classes of photo-switching compounds suitable for use as adhesive materials include stilbenes, diarylethenes, and Donor-Acceptor Stenhouse Adducts.

In one embodiment, the thin film comprises a photo-switchable compound of the spiropyran-merocyanine system. In certain embodiment, the thin film consists essentially of, or consists of, the photo-switchable compound of the spiropyran-merocyanine system.

Spiropyrans exhibit an extraordinarily wide range of responsivity to photons, redox changes, and changes in temperature and pH (Kortekaas et al., "The Evolution of Spiropyran: Fundamentals and Progress of an Extraordinarily Versatile Photochrome," *Chem. Soc. Rev.* 48: 3406 (2019), which is hereby incorporated by reference in its entirety). The structural formula of the closed-ring isomer of spiropyran comprises an indoline and a chromene moiety bound together via a spiro junction and oriented perpendicular with respect to one another (Klajn, R., "Spiropyran-based dynamic materials" *Chem. Soc. Rev.,* 243:148-184 (2014), which is hereby incorporated by reference in its entirety). Heating of the closed ring spiropyran gives rise to the open-ring merocyanine isomer.

In one embodiment of the present application, the spiropyran is of formula (I)

(I)

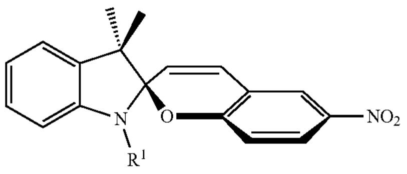

wherein $R^1$ is saturated or unsaturated $C_1$-$C_{20}$ alkyl (preferably $C_1$-$C_{10}$ alkyl), $—(CH_2)_n—OR^4$, or $—(CH_2)_n—OC(O)R^4$ where n is 1 to 6, preferably 2 to 4; and $R^4$ is saturated or unsaturated $C_1$-$C_{20}$ alkyl (preferably $C_1$-$C_{10}$ alkyl).

In another embodiment, the spiropyran is of formula (II)

(II)

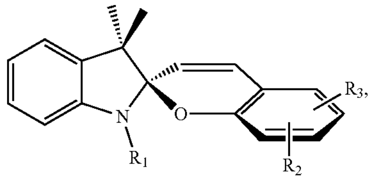

wherein $R^1$ is saturated or unsaturated $C_1$-$C_{20}$ alkyl (preferably $C_1$-$C_{10}$ alkyl), $—(CH_2)_n—OR^4$, or $—(CH_2)_n—OC(O)R^4$ where n is 1 to 6, preferably 2 to 4;

$R_2$ and $R_3$ are independently selected from the group of hydrogen, a silyl group, a nitro group, a cyano group, a halo group (fluoro, chloro, bromo, iodo), amino group (including primary, secondary, and tertiary amino groups), hydroxyl, saturated or unsaturated $C_1$ to $C_{20}$ alkyl group (preferably $C_1$-$C_{10}$ alkyl), a $C_1$ to $C_{20}$ alkoxy group (preferably $C_1$-$C_{10}$ alkoxy), an aryloxy group having 6 to 20 carbon atoms, a $C_1$ to $C_{20}$ alkylthio group (preferably $C_1$-$C_{10}$ alkylthio), an arylthio group having 6 to 20 carbon atoms, an aldehyde group, a keto group, an ester group, an amido group, a carboxylic acid group, a sulfonic acid group; or $R_2$ and $R_3$ together form a 5- or 6-membered unsaturated ring, optionally substituted with one or more groups selected from a silyl group, a nitro group, a cyano group, a halo group (fluoro, chloro, bromo, iodo), amino group (including primary, secondary, and tertiary amino groups), hydroxyl, saturated or unsaturated $C_1$ to $C_{20}$ alkyl group (preferably $C_1$-$C_{10}$ alkyl), a $C_1$ to $C_{20}$ alkoxy group (preferably $C_1$-$C_{10}$ alkoxy), an aryloxy group having 6 to 20 carbon atoms, a $C_1$ to $C_{20}$ alkylthio group (preferably $C_1$-$C_{10}$ alkylthio), an arylthio group having 6 to 20 carbon atoms, an aldehyde group, a keto group, an ester group, an amido group, a carboxylic acid group, or a sulfonic acid group; and $R^4$ is saturated or unsaturated $C_1$-$C_{20}$ alkyl (preferably $C_1$-$C_{10}$ alkyl).

Exemplary spiropyran compounds include, without limitation:

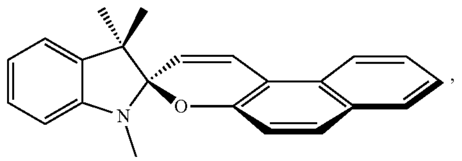

,

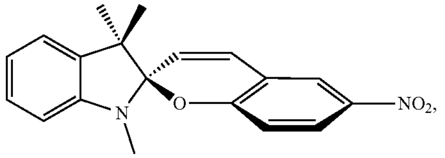

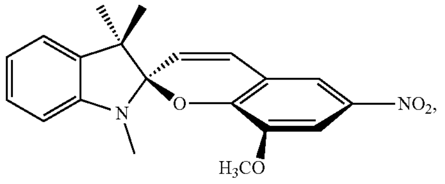

-continued

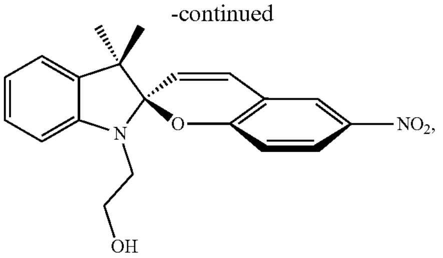

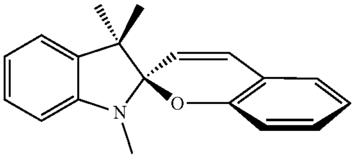

,

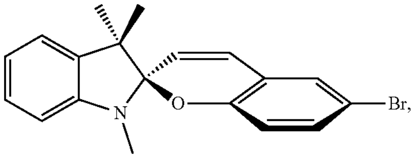

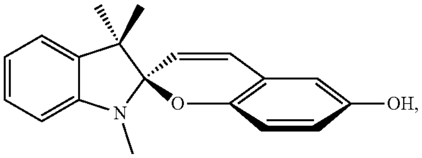

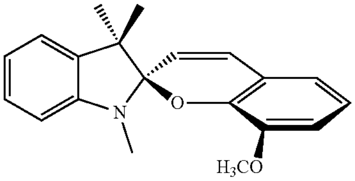

, and

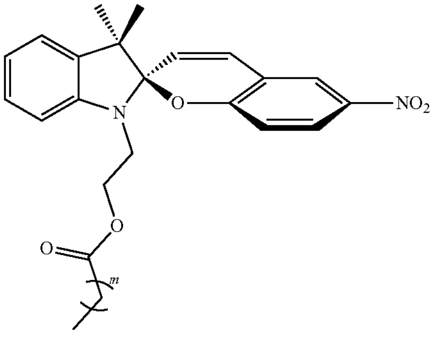

where m is 1 to 11.

Additional exemplary spyropyrans include, but are not limited to, 3-(2-(2-hydroxystyryl)-3,3-dimethyl-3H-indol-1-ium-1-yl)propane-1-sulfonate, 1',3',3'-trimethylspiro[chromene-2,2'-indoline], 1',3',3'-trimethyl-6-nitrospiro[chromene-2,2'-indoline], 1',3',3',8-tetramethylspiro[chromene-2,2'-indoline], as described by Samanta et al., "Reversible Chromism of Spiropyran in the Cavity of a Flexible Coordination Cage," *Nature Communications* 9: 641 (2018), which is hereby incorporated by reference in its entirety; 3',3'-Dimethyl-6-nitro-Spiro[2H-1-benzopyran-2,2'-[2H]indole]-1'(3'H)-propanol, 3',3'-Dimethyl-Spiro[2H-1-benzopyran-2,2'-[2H]indole]-1'(3'H)-propanol, 3',3'-Dimethyl-6-chloro-Spiro[2H-1-benzopyran-2,2'-[2H]indole]-1'(3'H)-propanol, 3',3'-Dimethyl-6-methoxy-Spiro[2H-1-benzopyran-2,2'-[2H]indole]-1'(3'H)-propanol, 3',3'-Dimethyl-6,8-dibromo-Spiro[2H-1-benzopyran-2,2'-[2H]indole]-1'(3'H)-propanol, 3',3'-Dimethyl-6-ethynyl-Spiro[2H-1-benzopyran-2,2'-[2H]indole]-1'(3'H)-propanol, 3',3'-Dimethyl-6-ethynyl-8-methoxy-Spiro[2H-1-benzopyran-2,2'-[2H]indole]-1'(3'H)-propanol, 3',3'-Dimethyl-6-bromo-Spiro[2H-1-benzopyran-2,2'-[2H]indole]-1'(3'H)-propanol, 3',3'-Dimethyl-8-methoxy-6-nitro-Spiro[2H-1-benzopyran-2,2'-[2H]indole]-1'(3'H)-propanol, 3',3'-Dimethyl-6-bromo-8-methoxy-Spiro[2H-1-benzopyran-2,2'-[2H]indole]-1'(3'H)-propanol, 3',3'-Dimethyl-7-methoxy-Spiro[2H-1-benzopyran-2,2'-[2H]indole]-1'(3'H)-propanol, 1'-(3-Iodopropyl)-1',3'-dihydro-3',3'-dimethyl-6-nitro-Spiro[2H-1-benzopyran2,2'[2H]indole], 1'-(3-Iodopropyl)-1',3'-dihydro-3',3'-dimethyl-6-chloro-Spiro[2H-1-benzopyran-2,2' [2H]indole], 1'-(3-Iodopropyl)-1',3'-dihydro-3',3'-dimethyl-6,8-dibromo-Spiro[2H-1-benzopyran-2,2'[2H]indole], 1'-(3-Iodopropyl)-1',3'-dihydro-3',3'-dimethyl-6-bromo-8-methoxy-Spiro[2H-1-benzopyran-2,2'-[2H]indole], 1'-(3-Iodopropyl)-1',3'-dihydro-3',3'-dimethyl-6-nitro-8-methoxy-Spiro[2H-1-benzopyran-2,2'-[2H]indole], 1'-(3-Iodopropyl)-1',3'-dihydro-3',3'-dimethyl-6-ethynyl-Spiro[2H-1-benzopyran-2,2'-[2H]indole], 1'-(3-Iodopropyl)-1',3'-dihydro-3',3'-dimethyl-spiro[3H]naphth[2,1-b][1,4]oxazine, 1'-(3-Azidopropyl)-1',3'-dihydro-3',3'-dimethyl-6-nitro-Spiro[2H-1-benzopyran2,2'[2H]indole], 1-(1',3'-dihydro-3'3'-dimethyl-6-nitro-spiro[2H-1-benzopyran-2,2'[2H]indole]-1'-propyl-1H-[1,2,3]triazol-4-yl)-pyrene, as described by Beyer et al., "Synthesis of Spiropyrans As Building Blocks for Molecular Switches and Dyads," *J. Org. Chem.* 75(8):2752-2755 (2010), which is hereby incorporated by reference in its entirety. Variants of these spiropyrans with $C_1$ to $C_{10}$ alkyl, alkoxy, or alkyl-ester sidechains of the indoline nitrogen can be prepared, and are expected to facilitate formation of glassy thin film upon heating and supercooling as described herein.

Additional suitable spiropyran compounds that can be used according to the present application include those described in the U.S. Patent Application Publication No. 2003/0002132 to Foucher et al., U.S. Patent Application Publication No. 2006/0001944 to Chopra et al., U.S. Patent Application Publication No. 2006/0286481 to lftime et al., each of which is hereby incorporated by reference in its entirety.

For example, (R)-2-(3',3'-dimethyl-6-nitrospiro[chromene-2,2'-indolin]-1'-yl)ethyl alkanoates, whose structure is shown above, can be prepared by reacting the previously known (R)-2-(3',3'-dimethyl-6-nitrospiro[chromene-2,2'-indolin]-1'-yl)ethan-1-ol with a $C_1$ to $C_{11}$ carboxylic acid in a two-step synthesis. In a first step, the carboxylic acid is reacted with oxalyl chloride in dichloromethane (dry) and catalyst in dimethylformamide. In a second step, the ethanol group of the spiropyran is converted to the alkyl ester by reacting the intermediate with trimethylamine, dichloromethane: (dry), and the starting spiropyran at room temperature overnight.

In another embodiment, the thin film comprises a photo-switchable compound of the cis/trans azobenzene system. In certain embodiment, the thin film consists essentially of, or consists of, the photo-switchable compound of the cis/trans azobenzene system.

Azobenzene-based compounds are capable of reversible photoisomerization. Azobenzenes exhibit rapid and reversible trans-cis photoisomerization upon irradiation with UV or visible light. The large structural and dipole moment change associated with this isomerization also causes significant optical and surface property changes.

Exemplary azobenzenes for use in the present application include azobenzenes with substitution at the para-position of the azobenzene core, as shown in formula (III):

(III)

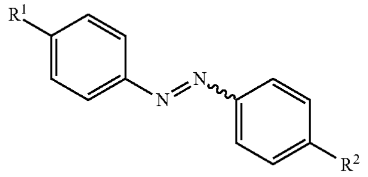

wherein $R^1$ and $R^2$ are independently H, a halogen, saturated or unsaturated $C_1$-$C_{20}$ alkyl (preferably $C_1$-$C_{10}$ alkyl), —$OR^3$, —$OC(O)R^3$;

$R^3$ is a H, or a saturated or unsaturated $C_1$-$C_{20}$ alkyl (preferably $C_1$-$C_{10}$ alkyl); and at least one of $R^1$, $R^2$, or $R^3$ is $C_1$-$C_{20}$ alkyl, preferably $C_1$-$C_{10}$.

One exemplary azobenzene derivative of formula (I) is 4-(phenyldiazenyl)phenyl tridecanoate, which has the following structure:

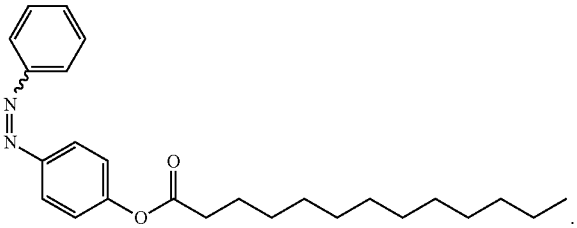 [SMILES: CCCCCCCCCCCCC(=O)Oc1ccc(N=Nc2ccccc2)cc1]

Synthetic procedures for halide-functionalized (F, Cl, Br, I) azobenzenes are reported in Lv et al., "Photocatalyzed Oxidative Dehydrogenation of Hydrazobenzenesto Azobenzenes," *Green Chem.* 21(15):4055-4061 (2019), which is hereby incorporated by reference in its entirety. Additional synthetic procedures for ortho-fluoridated azobenzenes are described in Bléger et al., *J. Am. Chem. Soc.* 134:20597-20600 (2012), which is hereby incorporated by reference in its entirety, including the following compounds 2,2',6,6'-tetrafluoroazobenzene, 2,2',6,6'-tetrafluoro-4,4'-diacetamidoazobenzene, and diethyl-4,4'-(2,2',6,6'-tetrafluoro) azobenzene dicarboxylate. Variants of these azobenzenes with alternative $C_1$ to $C_{10}$ alkyl or alkoxy sidechains can be prepared, and are expected to facilitate formation of glassy thin films upon heating and supercooling as described herein.

Other suitable azobenzene compounds that can be used according to the present application include those described in the U.S. Patent Application Publication No. 2018/0355234 to Grossman et al., which is hereby incorporated by reference in its entirety.

In another embodiment, the thin film comprises a photo-switchable compound of the cis/trans arylazopyrrole or arylazopyrazole systems. In certain embodiment, the thin film consists essentially of, or consists of, the photo-switchable compound of the cis/trans arylazopyrrole or arylazopyrazole systems.

Arylazopyrrole- and arylazopyrazole-based compounds are capable of reversible photoisomerization. They exhibit rapid and reversible trans-cis photoisomerization upon irradiation with UV or visible light. The large structural and dipole moment change associated with this isomerization also causes significant optical and surface property changes.

Exemplary arylazopyrroles and arylazopyrazoles include, but are not limited to, (E)-1-methyl-2-(phenyldiazenyl)-1H-pyrrole, (E)-3,5-dimethyl-2-(phenyldiazenyl)-1H-pyrrole, (E)-1,3,5-trimethyl-2-(phenyldiazenyl)-1H-pyrrole, (E)-1-methyl-4-(phenyldiazenyl)-1H-pyrazole, and (E)-1,3,5-trimethyl-4-(phenyldiazenyl)-1H-pyrazole as described by Weston et al., "Arylazopyrazoles: Azoheteroarene Photoswitches Offering Quantitative Isomerization and Long Thermal Half-Lives," *J. Am. Chem. Soc.* 136(34):11878-11881 (2014), which is hereby incorporated by reference in its entirety; (E)-3,5-Dimethyl-4-(phenyldiazenyl)-1H-pyrazole, (E)-3,5-Dimethyl-4-(p-tolyldiazenyl)-1H-pyrazole, (E)-3,5-Dimethyl-4-(m-tolyldiazenyl)-1H-pyrazole, (E)-3,5-Dimethyl-4-(o-tolyldiazenyl)-1H-pyrazole, (E)-3,5-Diethyl-4-(phenyldiazenyl)-1H-pyrazole, (E)-4-((3,5-Dimethylphenyl)diazenyl)-3,5-dimethyl-1H-pyrazole, (E)-4-(Mesityldiazenyl)-3,5-dimethyl-1H-pyrazole, (E)-4-((4-Isopropylphenyl)diazenyl)-3,5-dimethyl-1H-pyrazole, (E)-4-((4-(tert-Butyl)phenyl)diazenyl)-3,5-dimethyl-1H-pyrazole, (E)-3,5-Dimethyl-4-(naphthalen-2-yldiazenyl)-1H-pyrazole, (E)-4-((4-Methoxyphenyl)diazenyl)-3,5-dimethyl-1H-pyrazole, (E)-4-((4-Isopropoxyphenyl)diazenyl)-3,5-dimethyl-1H-pyrazole, (E)-3-((3,5-Dimethyl-1H-pyrazol-4-yl)diazenyl)pyridine, (E)-3,5-Dimethyl-4-((4-(trifluoromethoxy)phenyl)diazenyl)-1H-pyrazole, (E)-3,5-Dimethyl-4-((4-(trifluoromethyl)phenyl)diazenyl)-1H-pyrazole, (E)-4-((3,5-Dimethyl-1H-pyrazol-4-yl)diazenyl)benzonitrile, (E)-3,5-Dimethyl-4-((3-nitrophenyl)diazenyl)-1H-pyrazole, and (E)-3,5-Dimethyl-4-((4-nitrophenyl)diazenyl)-1H-pyrazole as described by Stricker et al., "Arylazopyrazole Photoswitches in Aqueous Solution: Substituent Effects, Photophysical Properties, and Host-Guest Chemistry," *Chemistry Eur. J.* 24(34): 8639-8647 (2018), which is hereby incorporated by reference in its entirety; (E)-4-((2,6-Dimethoxyphenyl)diazenyl)-1,3,5-trimethyl-1H-pyrazole, (E)-4-((2,6-Difluorophenyl)diazenyl)-1,3,5-trimethyl-1H-pyrazole, (E)-4-((2,6-Dichlorophenyl)diazenyl)-1,3,5-trimethyl-1H-pyrazole, and (E)-4-((2,6-Difluorophenyl)diazenyl)-1-methyl-1H-pyrazole as described by Calbo et al., "A Combinatorial Approach to Improving the Performance of Azoarene Photoswitches," *Beilstein J. Org. Chem.* 15:2753-2764 (2019), which is hereby incorporated by reference in its entirety. Variants of these arylazopyrroles or arylazopyrazoles with $C_1$ to $C_{10}$ alkyl, alkoxy, or alkyl-ester sidechains can be prepared, and are expected to facilitate formation of glassy thin film upon heating and supercooling as described herein.

In another embodiment, the thin film comprises a photo-switchable compound of the diarylethene system. In certain embodiment, the thin film consists essentially of, or consists of, the photo-switchable compound of the diarylethene system.

Diarylethenes undergo structural change upon UV and visible light irradiation. By functionalizing the thiophene moiety with short alkyl chains, it is expect to see a change of the phase of molecules upon heating and supercooling. Synthesis of these materials is described in Yamaguchi et al., "Photochromism of bis(2-alkyl-1-benzothiophen-3-yl) Perfluorocyclopentene Derivatives," *Journal of Photochemistry and Photobiology A: Chemistry* 178:162-169 (2006), which is hereby incorporated by reference in its entirety. Additional diarylethenes that may be useful in the present application are disclosed in U.S. Pat. Nos. 10,556,912 and 7,777,055 to Branda et al.; U.S. Pat. No. 7,556,844 to Iftime et al.; and Morimoto et al., "Photoswitchable Fluorescent Diarylethene Derivatives with Thiophene 1,1-Dioxide Groups: Effect of Alkyl Substituents at the Reactive Carbons," *Materials*

(*Basel*) 10(9):1021 (2017); Uno et al., "Multicolour Fluorescent "Sulfide-Sulfone" Diarylethenes with High Photo-Fatigue Resistance," *Chem Commun.* 56:2198-2201 (2020), each of which is hereby incorporated by reference in its entirety.

One exemplary diarylethene that may be used in the present application is shown below:

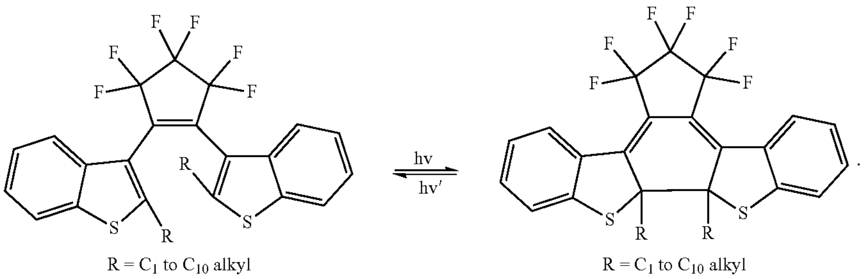

In yet another embodiment, the thin film comprises a photo-switchable compound of the cis/trans stilbene system. In certain embodiment, the thin film consists essentially of, or consists of, the photo-switchable compound of the cis/trans stilbene system.

Suitable stilbene compounds that can be used according to the present application include those disclosed in Yang et al., "Stilbene analogs in Hula-Twist Photoisomerization," *Photochem. Photobiol. Sci.,* 5:874-882 (2006) and U.S. Pat. No. 7,220,784 to Hadfield et al. ("Hadfield"), which are hereby incorporated by reference in their entirety. These stilbene compounds can be prepared using the methods described therein.

In still another embodiment, the thin film comprises a photo-switchable Donor-Acceptor Stenhouse Adduct (DASA). In certain embodiment, the thin film consists essentially of, or consists of, the photo-switchable Donor-Acceptor Stenhouse Adduct (DASA). Suitable Donor-Acceptor Stenhouse Adduct (DASA) that can be used according to the present application include the ones disclosed in U.S. Patent Application Publication No. 2019/0127345 to Read de Alaniz et al., which is hereby incorporated by reference in its entirety.

A second aspect of the present invention relates to a method of releasably supporting a product. This method includes adhering a product onto the thin film of the device of the present invention; and exposing the thin film to light sufficient to cause a change in the adhesive strength of the thin film.

According to the present invention, the light that can be used for exposure of the thin film includes visible light, infrared light, or UV light.

In one embodiment, the light is infrared, and the exposing increases the adhesive strength of the thin film because it allows for melting and supercooling of the heated film to for the amorphous glassy state.

In another embodiment, the light is visible or UV light, and the exposing decreases the adhesive strength of the thin film, because light-induced isomerization promotes crystallization. The reduction in the adhesive strength of the film is at least about 25%, 35%, 45%, 55%, 65% or 75% or more.

One embodiment relates to the method of releasably supporting a product according to the second aspect of the invention, that further includes removing the product from the thin film on the device once the reduction in adhesive strength is achieved.

Another embodiment relates to the method of releasably supporting a product according to the second aspect of the invention that further includes steps of:

reheating the thin film to a temperature suitable to cause an increase in the adhesive strength of the thin film;

adhering a second product to the thin film of the device;

repeating said exposing to decrease the adhesive strength of the thin film; and repeating the removing step for the second product.

In one embodiment, the steps of reheating, adhering, exposing, and removing are repeated for additional product releasably supported on the device.

According to the present invention, reheating can be carried out to a temperature above the melting temperature of the photo-switchable adhesive material, but below 300° C., below 250° C., below 240° C., below 230° C., below 220° C., below 210° C., below 200° C., below 190° C., below 180° C., below 170° C., below 160° C., or below 150° C. Preferably, reheating is carried out to a temperature between 40° C. to 200° C., such as 40° C. to 60° C., or 60° C. to 80° C., or 80° C. to 100° C., or 120° C. to 140° C., or 140° C. to 160° C., or 160° C. to 180° C., or 180° C. to 200° C.

According to one embodiment, the step of exposing the thin film to light sufficient to cause a change in the adhesive strength of the thin film can be carried out with a light source coupled to an optical fiber and a lens. Where the thin film is present at a plurality of discrete locations on the substrate; the exposing step can be carried out on all or only a subset of the discrete locations.

Another aspect of the present invention relates to a method of making a device according to the present invention. This method includes providing the device having the substrate and applying the thin film to the substrate. The application methods include any of those mentioned above. Regardless of the manner in which the thin film is applied, the photo-switchable adhesive material is heated above its melting temperature and supercooled to form the amorphous, glassy film.

EXAMPLES

The following examples are intended to illustrate practice of the invention, and are not intended to limit the scope of the claimed invention.

Methods

$^1$H NMR spectra were recorded in solution on a Varian instrument 400 MHz and internally referenced to tetramethylsilane signal or residual protio-solvent signal. DSC analysis was conducted on a DSC 250 (TA Instruments) with an RSC 90 cooling component. Powder X-ray diffraction (XRD) patterns were recorded on Inel XRG 3000 diffractometer using Cu-Kα radiation (λ=1.5418 Å) with accelerating voltage and current of 40 kV and 30 mA, respectively. Samples for PXRD were prepared by placing a thin layer of the material on a zero-background silicon crystal plate. Low magnification digital images were acquired using a Celestron Handheld Digital Microscope Pro and high magnification optical images were obtained by an Olympus BX41 optical microscope with a 100× objective.

Example 1—Solid-State NMR

Solid-state $^{13}C$ and $^{1}H$ NMR experiments were conducted on a BRUKER AVANCE NEO 400 spectrometer in a 4 mm magic angle spinning (MAS) double resonance probe head at 100 MHz and 400 MHz for $^{13}C$ and $^{1}H$, respectively. The $^{13}C$ chemical shift was referenced to TMS via the carbonyl of α-glycine at 176.49 ppm as a secondary reference. Quantitative multiCP (Duan et al., "Composite-Pulse and Partially Dipolar Dephased MultiCP for Improved Quantitative Solid-State $^{13}C$ NMR," *J. Magn. Reson.,* 285:68-78 (2017), which is hereby incorporated by reference in its entirety) $^{13}C$ NMR spectra were recorded at MAS frequencies of 14 kHz with signal averaging for 2 to 5 hours, except for the spectrum shown in FIG. 4A, which was measured at 10 kHz with signal averaging for two days. The recycle delay for all the samples was 4 s. The SPINAL-64 supercycle (Fung et al., "An Improved Broadband Decoupling Sequence for Liquid Crystals and Solids," *J. Magn. Reson.,* 142:97-101 (2000), which is hereby incorporated by reference in its entirety) was employed for high-power $^{1}H$ decoupling during acquisition. MultiCP experiments with recoupled gated decoupling (Mao et al., "Accurate Quantification of Aromaticity and Nonprotonated Aromatic Carbon Fraction in Natural Organic Matter by $^{13}C$ Solid-State Nuclear Magnetic Resonance," *Environ. Sci. Technol.* 38:2680-2684 (2004), which is hereby incorporated by reference in its entirety) were conducted to select the signals of nonprotonated $^{13}C$ and mobile $CH_3$. To check for structural changes in the samples due to the centrifugal force exerted during 14-kHz MAS, multiCP experiments with TOSS (Dixon et al., "Total Suppression of Sidebands in CPMAS C-13 NMR," *J. Magn. Reson.* 49:341-345 (1982), which is hereby incorporated by reference in its entirety) were recorded at a low MAS frequency of 3 kHz before and after the 14 kHz measurements. The ACD/C+H NMR predictor was employed to simulate the $^{13}C$ chemical shifts of the compounds of interest.

Example 2—UV-Vis Absorption Spectroscopy

UV-Vis adsorption spectra were obtained with a Cary 50 Bio UV-Vis Spectrophotometer in a UV Quartz cuvette with a pathlength of 10 mm. Compounds were dissolved in DMSO (0.01 mg/mL), methanol (0.01 mg/mL), and toluene (0.025 mg/mL). For the MC decay measurement, the UV-Vis absorption was first recorded in the dark for 10 min, then SP samples were irradiated with a UV lamp (365 nm, 100 W) until no change in their absorbance was observed. After the UV lamp was turned off, the samples were monitored in the dark until the original spectra were recovered.

Thin-film samples were prepared by placing powder on a pre-cleaned glass slide and heating up to 210° C. on a hot plate. The melt was sandwiched with another glass slide to spread and fill the entire area. Then it was slowly cooled in 10° C. decrements until room temperature was reached. The film edges were sealed by LavaLock 650 F High Temp Silicon Adhesive to fix the thickness prior to the UV-Vis measurement on films at various temperatures.

Discussion of Examples 1 and 2

FIGS. 3A-L summarize the phase transitions of SP derivatives 1-4. During initial heating up to 180-210° C., all crystalline SP compounds (1-4) showed endothermic peaks (red shading) that correspond to melting at around 170-180° C., but the molten phase of SP compounds behaved differently upon subsequent cooling (FIGS. 3A-C, G, H). Only compound 1 readily crystallized above 120° C., while compounds 2-4 did not exhibit exothermic crystallization on differential scanning calorimetry (DSC) even after cooling down to −50° C. Instead, compounds 2-4 underwent glass transitions at 44-58° C., forming an amorphous solid (glass) at room temperature. Compound 4, in particular, showed an intriguing cold-crystallization behavior when the supercooled glass was heated from −50° C. to 112° C. (FIG. 3G). The cold-crystallization was not observed if the supercooling was stopped at temperatures above −35° C. (FIG. 3H). The thermal decomposition of compounds is negligible, as confirmed by the unchanged NMR spectra of compounds obtained after repeated DSC cycles. Thermogravimetric analysis (TGA) was performed and confirmed thermal stability of compounds 1, 2, and 4 up to 200° C. and that of compound 3 up to 180° C. The identical thermal behaviors of the compounds measured at varied rates (10 and 2° C./min) was also confirmed. The temperature and enthalpy involved in each transition were recorded and presented in Table 1 below.

TABLE 1

Thermodynamic Parameters Obtained by Analyzing DSC Cycles

| | 1 | 2 | 3 | 4 |
|---|---|---|---|---|
| $T_m$ (° C.) | 180 | 169 | 171 | 179 |
| $T_c$ (° C.) | 122 | — | — | — |
| $T_g$ (° C.) | — | 54 | 58 | 44 |
| $T_{cc}$ (° C.) | — | — | — | 112 |
| $\Delta H_m$ (J/g) | 91.6 | 81.3 | 108.4 | 106.2 |
| $\Delta H_c$ (J/g) | 62.9 | — | — | — |
| $\Delta H_{cc}$ (J/g) | — | — | — | 64.4 |

$T_m$: melting point,
$T_c$: crystallization point,
$T_g$: glass transition point,
$T_{cc}$: cold-crystallization point,
$\Delta H_m$: heat of fusion,
$\Delta H_c$: heat of crystallization,
$\Delta H_{cc}$: heat of cold-crystallization During these thermal cycles, initially crystalline compounds 1-4 showed darker and more vivid color in their molten phase (FIGS. 3D-F, I), which indicated the increased population of the conjugated MC isomers at high temperatures. As the molten compounds were cooled and crystalline or amorphous solids formed, the color turned lighter, which indicated a decreased MC content. X-ray diffraction (XRD) measurement (FIGS. 3J-L) corroborated the DSC results and visual observations; initially crystalline SP derivatives showed strong diffraction patterns (black lines). Except for compound 1, which immediately crystallized after melting and cooling, other compounds (2-4) formed an amorphous solid phase after melting and cooling, supported by the absence of diffraction peaks. Interestingly, amorphous compound 4 started to exhibit diffraction peaks only upon further cooling to −50° C., and the peaks became more pronounced after the cold-crystallization at 112° C. This indicated that compound 4 formed small crystalline nucleation seeds when cooled to −50° C., which induced cold-crystallization upon subsequent heating. This seed formation was not observed in films of compounds 2 and 3. The crystal structures of compound 1, 3, and 4 as spiropyran and merocyanine forms showed distinct structural differences and intermolecular packing in solid state. Also, drastically different dipole moments of the SP (~4-6 D) and MC form (~14-18 D)[11] indicated that thermally generated MC isomers in SP matrix during the melting process exerts a significant effect on SP packing and phase transition.

To assess the impact of SP-MC isomerization on the different phase transitions, the relative concentration of each isomer in condensed phase were measured at room temperature as well as high temperatures during the melting-cooling process. First, a quantitative solid-state $^{13}C$ NMR spectrum of melt-cooled compound 2 was taken at room temperature (FIG. 4A), which confirmed its amorphous nature by displaying peaks significantly broadened compared to those of pristine crystalline compound 2. Surprisingly, most of the observed chemical shifts corresponded to those of SP. The concentration of MC was low as indicated by the small intensity of the characteristic MC peaks near 180 ppm from the non-protonated carbon atoms that are double-bonded to O and N in the MC resonance structures (FIG. 4A inset). The combined peak intensity is 0.09% relative to SP peaks at 100-150 ppm, which corresponds to 0.7±0.2 wt % of MC in the solid. This analysis of MC concentration in amorphous compound 2 was confirmed by performing a comparative UV-Vis measurement of amorphous films (around 5 μm thick) and solutions (1 and 0.01 mg/mL in DMSO-$d^6$) whose MC content was measured by $^1H$ NMR. Assuming the same molar extinction coefficient (ε at around 600 nm) of MC isomer in solution and in SP solid matrix, around 1 wt % MC (0.05 M) was obtained in the amorphous solid, in agreement with the result of solid-state NMR. The amorphous solid of compound 2 was still vividly colored as seen in FIG. 3E, and the UV-Vis of the film also showed strong absorption around 500-700 nm due to the high E value.

Given this low MC content in the mixture, it was assumed that the MC-to-SP conversion during the cooling of the molten compound occurs rapidly and may differently impact the crystallization of each molten compound. FIG. 4B shows the MC concentration changing in neat films during spontaneous cooling immediately after melting. The UV-Vis spectra of heated films were first obtained, and then the absorbance change was converted to concentration change by applying the E measured in solution and calibrated by solution NMR and the film thickness measured by a profilometer (Table 2). Analogous to solution-state behavior, compounds 1-4 displayed significantly different MC concentration profiles in condensed phase for this cooling process. In detail, the measurements within the first 1.5 min (FIG. 4C) indicated that compound 1 possessed extremely low MC content even at high temperatures (0.1 wt % at 120° C.), while the other compounds maintained higher concentrations of MC especially above 120° C. (1.4 wt % for compound 2, 2.6 wt % for compound 3, and 0.7 wt % for compound 4 at 120° C.). This signified the role of MC isomers in preventing SP crystallization, acting as minor dopants, since only compound 1 crystallized above 120° C. whereas other compounds with higher MC content remained amorphous even after cooling to −50° C. (FIGS. 3A-L). Furthermore, compound 4, which cold-crystallizes after supercooling, exhibited a continuously decreasing MC content to 0.13 wt % at room temperature nearly identical to that of compound 1 (0.08 wt %). MC isomers of compound 3, produced during melting, formed H-aggregates as the film was cooled to room temperature, showing a blue shift of absorbance. MC concentration was evaluated by the absorbance change at 590 nm, consistent to the method used for compounds 1 and 2, but the overall decrease of the MC isomer 3 was minimal. The high MC content of melted compound 3 indicated that factors impacting the SP-MC equilibrium in condensed phase were analogous to those in solution state.

TABLE 2

Film Thickness of Compounds 1-4 Measured by a Profilometer

| | 1 | 2 | 3 | 4 |
|---|---|---|---|---|
| Thickness (μm) | 5.0 ± 0.1 | 5.8 ± 0.3 | 1.1 ± 0.1 | 4.9 ± 0.1 |

Based on these observations, the results were summarized in FIG. 5. When heated above the melting point, SP compounds thermally isomerize to entropy-favored MC forms to different degrees; compound 1 has a lower SP-to-MC conversion than compounds 2-4. Once liquefied and then cooled down, the MC-to-SP reversion takes place. Compound 1 with an initially low MC content readily crystallizes due to the negligible dopant effect. Compounds 2-4, on the other hand, contain significant MC dopants. Due to their very different molecular structure, the MC dopants, despite making up as little as around 1 wt % of the mixture, effectively disturb the ordering of mobile SP molecules, thus stabilizing the glassy phase. Compound 4 experiences further loss of the MC form upon cooling to −50° C. and thus develops the local crystalline packing of SP molecules or "nucleation seeds" (FIG. 3L) that enable cold-crystallization when thermal energy is provided.

Based on these results, it was assumed that the intrinsic equilibrium between SP and MC isomers of each compound in a condensed SP-rich system above $T_g$ impacts the phase transition. Thus, the kinetics of MC-to-SP isomerization was further investigated in a relatively non-polar and mobile medium (i.e. toluene solution) by first photo-saturating MC isomers then observing the MC decays at various temperatures (20, 40, and 60° C.) in the dark. The kinetic constants (k) of MC-to-SP conversion for compounds 1, 2, and 3 were obtained (Table 3), for example, 0.045, 0.020, and 0.002 $sec^{-1}$ at 20° C., respectively. This confirmed that the isomerization equilibrium favors SP saturation in the following order: compound 1>2>3, which is consistent with the results of our thin-film studies (FIG. 4B). The isomerization of compound 4 was challenging in various organic solutions due to the low activation energy for the thermal reversion (MC to SP) in such condition, thus its k value is not reported in Table 3 below.

TABLE 3 k and $t_{1/2}$ Measured for Each Solution at 20° C., 40° C., and 60° C.

| | 1 | 2 | 3 |
|---|---|---|---|
| k at 20° C. ($sec^{-1}$) | 0.045 | 0.020 | 0.002 |
| k at 40° C. ($sec^{-1}$) | 0.058 | 0.027 | 0.015 |
| k at 60° C. ($sec^{-1}$) | 0.071 | 0.034 | 0.023 |
| $t_{1/2}$ at 20° C. (sec) | 15.4 | 35.2 | 365 |
| $t_{1/2}$ at 40° C. (sec) | 11.9 | 23.3 | 44.9 |
| $t_{1/2}$ at 60° C. (sec) | 9.70 | 20.3 | 30.7 |

Example 3—Thermal, NMR, and Optical Analysis of Compound 5-8

Extensive studies of spiropyrans without a nitro group were performed, including unfunctionalized 5, 6-bromo-functionalized 6, 6-hydroxy-functionalized 7, and 8-methoxy-functionalized 8 (FIG. 7A). Upon melting and cooling to −50° C., compounds 5 and 6 exhibit amorphization, similar to compounds 2 and 3, while compound 8 shows cold-crystallization after the second heating to 64° C. Compound 7 decomposed during melting (FIG. 7B).

The analysis of their MC concentration was, however, extremely challenging due to the negligible presence of MC isomers in various organic solutions. FIG. 7C shows NMR spectra of compounds 5-8 in MeOH (i.e. one of the best solvents) at their maximum concentrations, but the presence of MC isomers was difficult to detect. This is in contrast to compounds 1-4 that showed significant MC:SP ratio in MeOH solutions, which allowed acquisition of solution-NMR-calibrated extinction coefficients (ε) of MC 1-4. Since the E of MC 5-8 could not be obtained, the dopant concentration in their films could not be calculated, either.

Compounds 5-8 ($T_m$ of 94-144° C.) decomposed at 180° C., the initial temperature applied to films 1-4 (FIG. 3B) for monitoring MC-to-SP conversion. At temperatures below 150° C., the absorbance of films 5-8 was very low around 500-700 nm and difficult to distinguish from noise (FIG. 7D). Despite the increased thickness of films (30-40 μm), the absorbance of MC isomer in the films is very low (<0.1), compared to compounds 1-4 (1-5 μm films showing absorbance of 0.5-3.0). Thin films (1-5 μm) of compounds 5-8 did not exhibit any noticeable absorbance at 500-700 nm.

Moreover, compounds 5-8 barely photoswitch in toluene or other solvents, so their solution-state MC-to-SP conversion kinetics could not be analyzed, either. These multiple challenges restricted direct comparison between the dopant levels in compounds 5-8 with those of 1-4.

Example 4—Stability and Optical Memory of Films Containing Compound 1-4

The application of the melt-cooled compounds as optical memory was demonstrated (FIGS. 6A-D). The amorphous films (compounds 2-4) generated by the simple melt-cooling process are an effective platform for optical switching and information storage, due to the photoswitching capability of SP molecules. A pattern on a film that is exposed to UV (365 nm) becomes darker as the MC content increases (FIGS. 6A-C). The film of compound 4 at room temperature was rapidly depleted of MC content (FIG. 4B), showing very light color. The contrast of the pattern was not as significant as that of compound 2 or 3. The patterns were maintained for weeks under ambient conditions and removed only by the simultaneous heating above $T_g$ and strong visible light irradiation, which triggered MC-to-SP reversion in the relatively mobile solid state. The crystalline film of compound 1, on the other hand, was found to be difficult to pattern with clear images, as a result of the constrained molecular packing in the crystalline phase (FIG. 6D). It was concluded that spiropyran derivatives with 6-nitro group and additional polar substituents, which generate and retain significant MC content through melting and amorphization process, are optimal for optical memory applications. The long storage time and the specific triggering mechanism for restoration are desired characteristics for effective optical memory (Liu et al., "Enhanced Two-Photon Photochromism in Metasurface Perfect Absorbers," *Nano Lett.* 18:6181-6187 (2018), which is hereby incorporated by reference in its entirety), and further studies of this unique property of neat amorphous solids and their viability for applications are currently being pursued.

Example 5—Stability and Optical Memory of Films Containing Compound 1-4

Adhesive samples were made by melting 5 mg of 1,3,3-Trimethylspiro[indoline-2,3'-[3H]naphth[2,1-b]pyran] between two glass slides as shown in FIG. 8B, forming a film of ~5 μm thick. Six samples were made and half were irradiated with UV light to weaken the adhesive strength. The shear force was applied and compared to the elongation of the sample as seen in FIG. 8C. Irradiation caused an approximately 35% reduction in adhesive strength.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A device comprising:

a substrate; and a thin film of a photo-switchable adhesive applied to at least one surface of the substrate, wherein the thin film is less than 250 μm in thickness, comprises at least 95% by weight of a photo-switchable compound and isomers thereof based on the weight of the thin film, and is essentially free of additives.

2. The device according to claim 1, wherein the photo-switchable compound and isomers thereof are in an amorphous glassy state, wherein the film is free of crystalline forms of the photo-switchable compound or isomers thereof.

3. The device according to claim 1, wherein the photo-switchable compound comprises a spiropyran-merocyanine system.

4. The device according to claim 3, wherein the spiropyran compound has a structure according to formula (I)

(I)

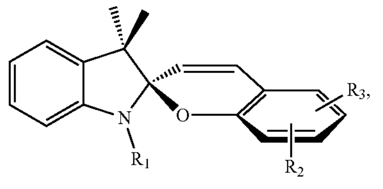

wherein $R_1$ is selected from the group of saturated or unsaturated $C_1$ to $C_{20}$ hydrocarbon;

$R_2$ and $R_3$ are independently selected from the group of hydrogen, a silyl group, a nitro group, a cyano group, a halo group (fluoro, chloro, bromo, iodo), amino group (including primary, secondary, and tertiary amino groups), hydroxyl, saturated or unsaturated $C_1$ to $C_{20}$ alkyl group, a $C_1$ to $C_{20}$ alkoxy group, an aryloxy group having 6 to 20 carbon atoms, a $C_1$ to $C_{20}$ alkylthio group, an arylthio group having 6 to 20 carbon atoms, an aldehyde group, a keto group, an ester group, an amido group, a carboxylic acid group, a sulfonic acid group; or $R_2$ and $R_3$ together form a 5- or 6-membered unsaturated ring, optionally substituted with one or more groups selected from a silyl group, a nitro group, a cyano group, a halo group (fluoro, chloro, bromo, iodo), amino group (including primary, secondary, and tertiary amino groups), hydroxyl, saturated or unsaturated $C_1$ to $C_{20}$ alkyl group, a $C_1$ to $C_{20}$ alkoxy group, an aryloxy group having 6 to 20 carbon atoms, a $C_1$ to $C_{20}$ alkylthio group, an arylthio group having 6 to 20 carbon atoms, an aldehyde group, a keto group, an ester group, an amido group, a carboxylic acid group, or a sulfonic acid group.

5. The device according to claim 3, wherein the spiropyran compound is:

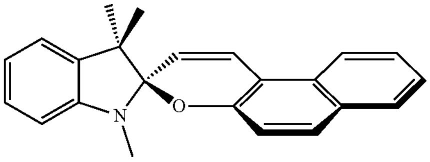

,

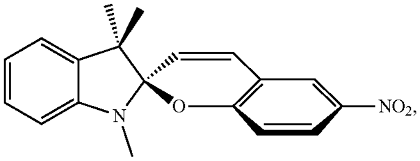

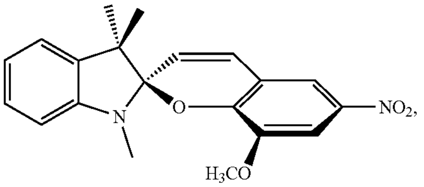

or

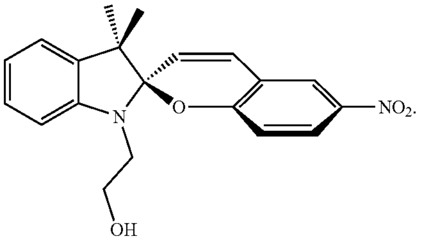

6. The device according to claim 3, wherein the spiropyran compound is:

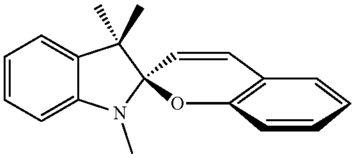

,

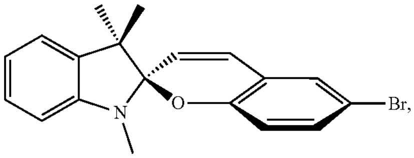

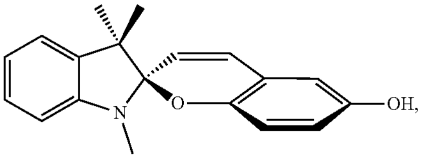

-continued

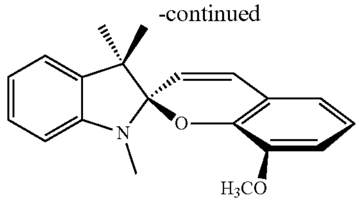

, or

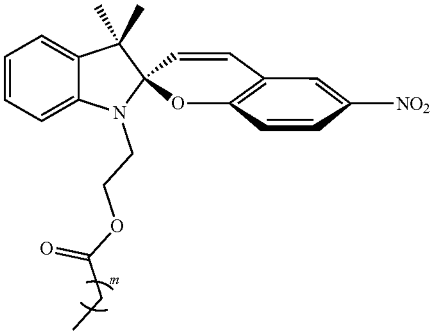

where m is 1 to 11.

7. The device according to claim 1, wherein the thin film is selected from the group consisting of a cis/trans azobenzene system, a cis/trans arylazopyrrole system, a cis/trans arylazopyrazole system, a cis/trans stilbene system, an open/closed ring diarylethene system, and a Donor-Acceptor Stenhouse Adduct (DASA) system.

8. The device according to claim 1, wherein the thin film is present at a plurality of discrete locations on the substrate.

9. The device according to claim 1 further comprising a release layer applied to the thin film.

10. The device according to claim 1, wherein the device is a holding device for an electronics component or silicon wafer.

11. A method of releasably supporting a product, the method comprising:

adhering a product onto the thin film of the device according to claim 1; and exposing the thin film to light sufficient to cause a change in the adhesive strength of the thin film.

12. The method according to claim 11, wherein the light is visible light, infrared light, or UV light.

13. The method according to claim 11, wherein said exposing increases the adhesive strength of the thin film.

14. The method according to claim 11, wherein said exposing decreases the adhesive strength of the thin film.

15. The method according to claim 14, further comprising after said exposing:

removing the product from the thin film on the device.

16. The method according to claim 15, further comprising:

reheating the thin film to a temperature suitable to cause an increase in the adhesive strength of the thin film;

adhering a second product to the thin film of the device;

repeating said exposing to decrease the adhesive strength of the thin film; and repeating the removing step for the second product.

17. The method according to claim 16, wherein said reheating is carried out to a temperature above a melting temperature of the photo-switchable adhesive.

18. The method according to claim 11, wherein said exposing is carried out with a light source coupled to an optical fiber and a lens.

19. The method according to claim 11, wherein the thin film is present at a plurality of discrete locations on the substrate; and said exposing is carried out by exposing a subset of the discrete locations to the light.

20. A method of making a device according to claim 1, comprising:

providing the device having the substrate; and applying the thin film to the substrate, melting the photo-switchable material on the substrate and then super-cooling the photo-switchable material.

* * * * *